United States Patent
Takla et al.

(10) Patent No.: US 11,546,233 B2
(45) Date of Patent: *Jan. 3, 2023

(54) VIRTUAL NETWORK FUNCTION BUS-BASED AUTO-REGISTRATION

(71) Applicant: Verizon Patent and Licensing Inc., Basking Ridge, NJ (US)

(72) Inventors: Mourad B. Takla, Hillsborough, NJ (US); Fernando Oliveira, Sudbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,937

(22) Filed: Dec. 20, 2021

(65) Prior Publication Data

US 2022/0116287 A1 Apr. 14, 2022

Related U.S. Application Data

(63) Continuation of application No. 17/061,816, filed on Oct. 2, 2020, now Pat. No. 11,228,508, which is a (Continued)

(51) Int. Cl.
*H04L 41/5041* (2022.01)
*G06F 9/455* (2018.01)
(Continued)

(52) U.S. Cl.
CPC ...... *H04L 41/5041* (2013.01); *G06F 9/45533* (2013.01); *G06F 9/542* (2013.01);
(Continued)

(58) Field of Classification Search
CPC . H04L 41/5041; H04L 41/069; H04L 43/091; G06F 9/45533; G06F 9/542
(Continued)

(56) References Cited

U.S. PATENT DOCUMENTS 10,042,662 B1   8/2018  Marquardt et al.
10,826,798 B2  11/2020  Takla et al.
(Continued)

FOREIGN PATENT DOCUMENTS

WO   2016/179603        11/2016
WO   WO-2016179603 A1 * 11/2016  ......... G06F 9/45558

OTHER PUBLICATIONS

"Apache Kafka: A distributed streaming platform", website (accessed Oct. 25, 2018). Retrieved from http://kafka.apache.org/.
(Continued)

*Primary Examiner* — Zi Ye

(57) ABSTRACT

A Network Functions Virtualization (NFV) system reads, from a data bus coupled to the NFV system, Virtual Network Function (VNF) parameters published to the data bus by a new VNF. The NFV system publishes, to the data bus based on the VNF parameters, instructions to multiple components of the NFV system defining which VNF capabilities of the new VNF are to be managed, controlled, or monitored by which of the multiple NFV system components. The multiple components of the NFV system control, manage, or monitor the new VNF based on the published instructions.

(Continued)

The data bus can include a Data Movement as a Platform (DMaaP) system that publishes and subscribes to streams of records.

20 Claims, 26 Drawing Sheets

Related U.S. Application Data continuation of application No. 16/170,182, filed on Oct. 25, 2018, now Pat. No. 10,826,798.

(51) Int. Cl.
*G06F 9/54* (2006.01)
*H04L 41/0866* (2022.01)
*H04L 41/069* (2022.01)
*H04L 43/091* (2022.01)

(52) U.S. Cl.
CPC ........ *H04L 41/069* (2013.01); *H04L 41/0866* (2013.01); *H04L 43/091* (2022.05); *G06F 2009/45583* (2013.01); *G06F 2009/45595* (2013.01)

(58) Field of Classification Search
USPC .......................................................... 709/206
See application file for complete search history.

(56) References Cited

U.S. PATENT DOCUMENTS

| | | | |
|---|---|---|---|
| 11,228,508 B2* | 1/2022 | Takla | .................. H04L 41/0895 |
| 2016/0381150 A1* | 12/2016 | Rajagopal | ............... H04L 41/40 709/223 |
| 2017/0068559 A1 | 3/2017 | Lee et al. | |
| 2017/0208147 A1 | 7/2017 | L'Anson et al. | |

OTHER PUBLICATIONS

"ONAP: Open Network Automation Platform", website [accessed Oct. 25, 2018], Retrieved from https://www.onap.org/.

Buckley, "ONAP Amsterdam release furthers automated virtualization trend", Nov. 20, 2017, FierceTelecom, https://www.fiercetelecom.com/telecom/onap-further-virtualization-automation-trend-amsterdam-release (Year: 2017).

Khandelwal, "DMaaP—Data Movement as a Platform", 05116/2017, wiki.onap.org, https://wiki.onap.org/pages/viewpage.action?pageId=3247130 (Year: 2017).

* cited by examiner

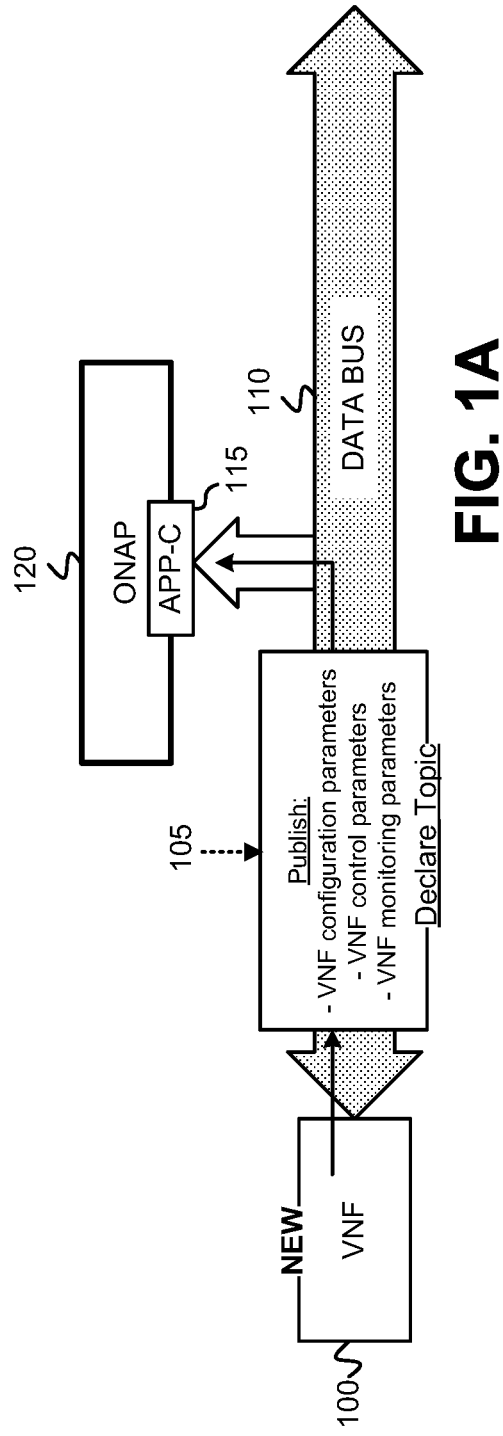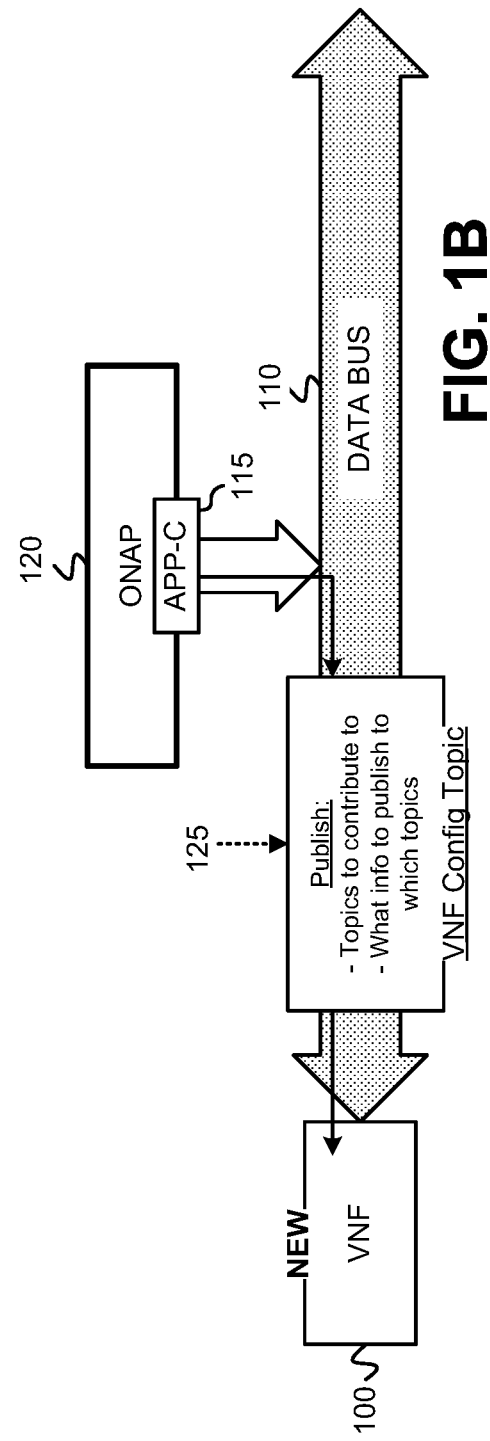

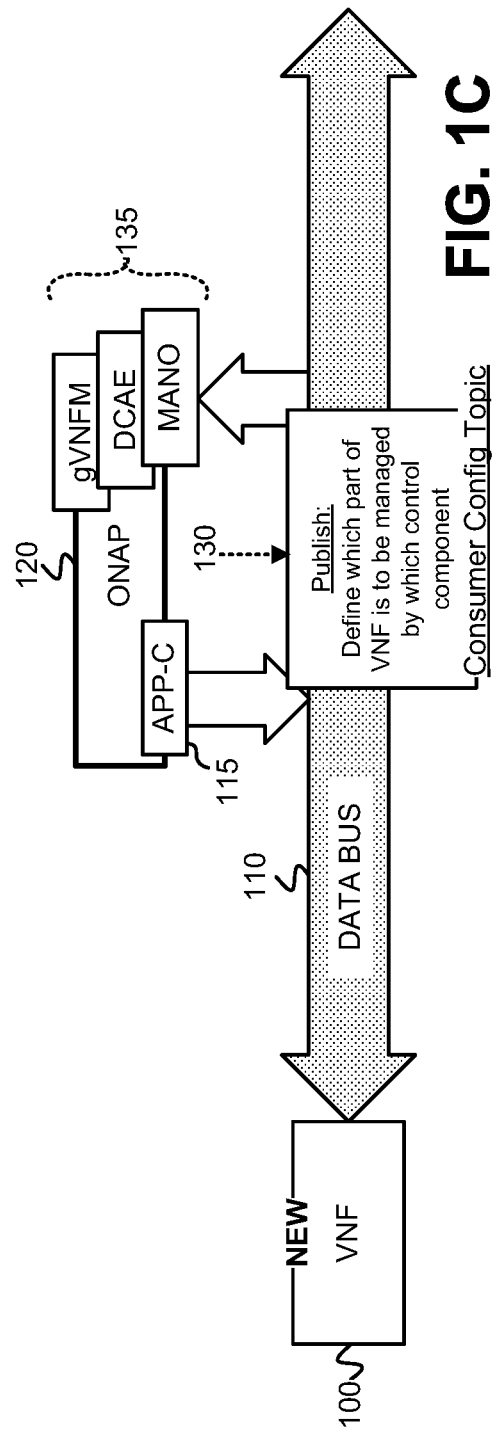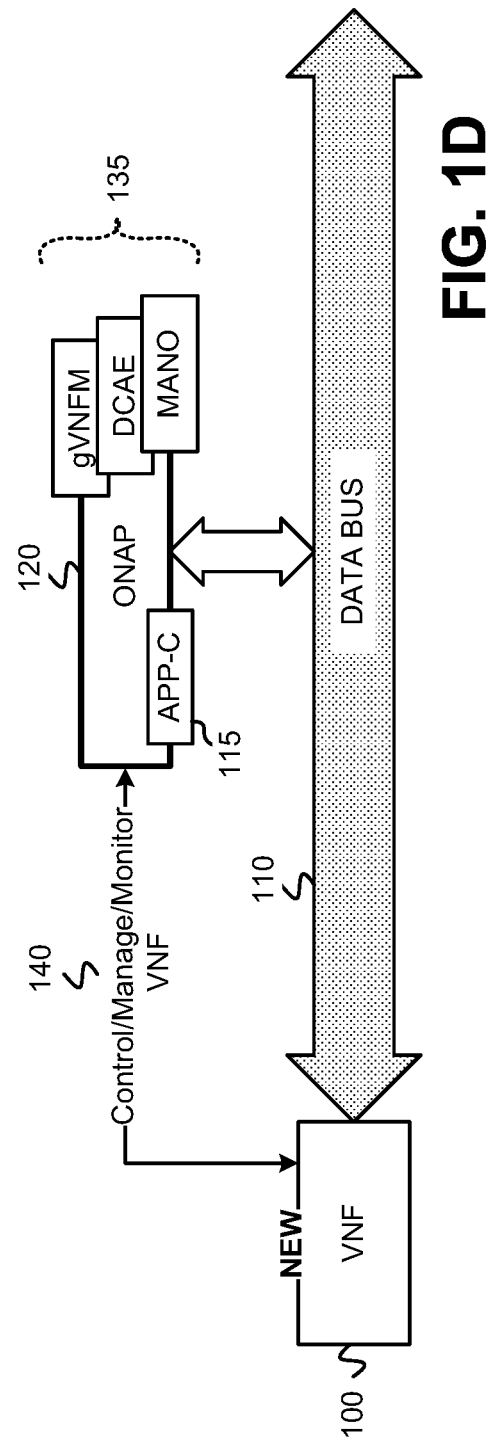

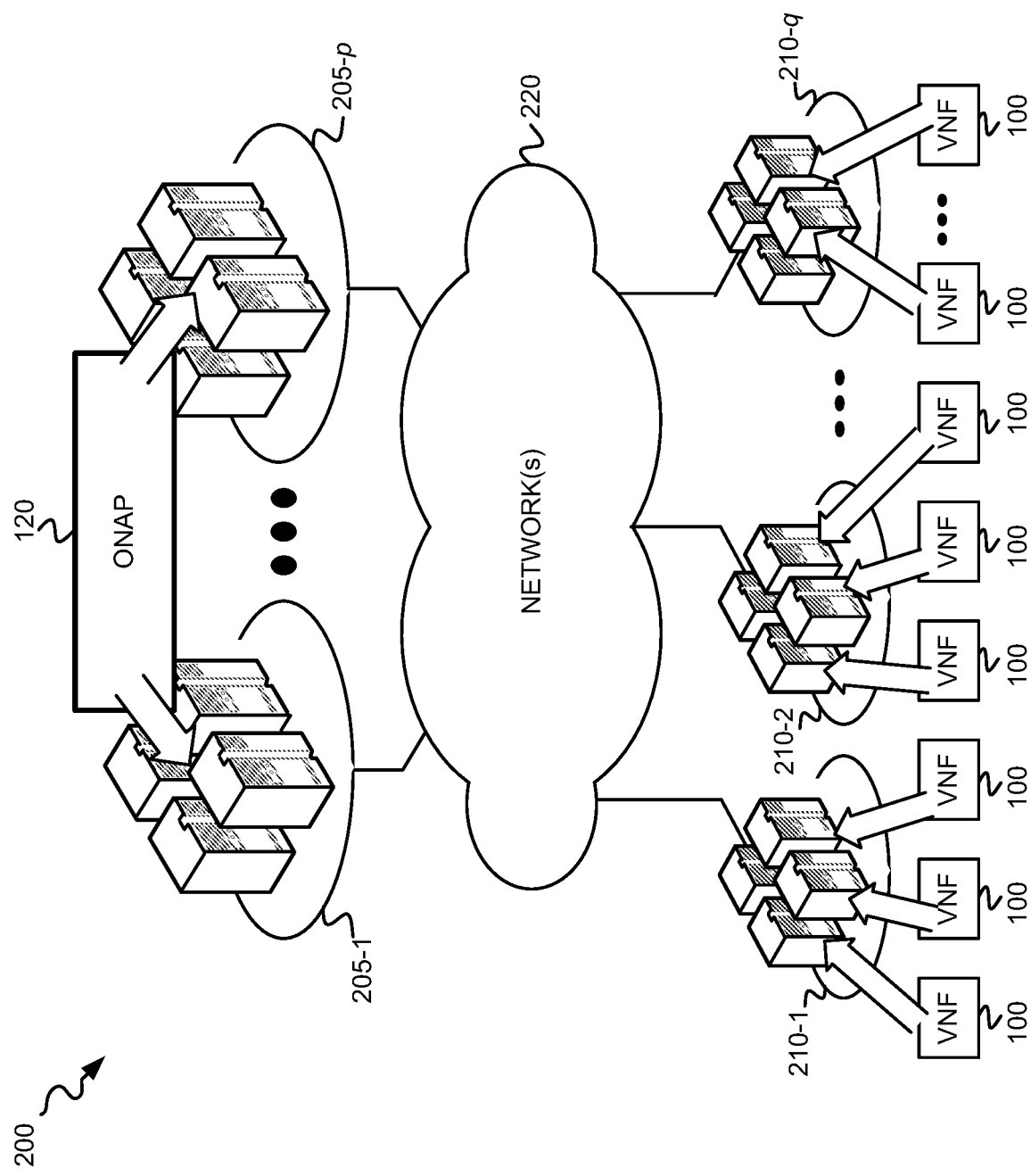

VIRTUAL NETWORK FUNCTION BUS-BASED AUTO-REGISTRATION

CROSS REFERENCE TO RELATED APPLICATIONS

The patent application is a continuation of U.S. patent application Ser. No. 17/061,816, filed on Oct. 2, 2020, which is a continuation of U.S. patent application Ser. No. 16/170,182, filed on Oct. 25, 2018 (now, U.S. Pat. No. 10,826,798), the contents of each of which are hereby incorporated by reference in their entirety.

BACKGROUND

A virtual machine (VM) includes a software-based emulation of a physical computer where the virtual machine executes programs like a physical machine. A characteristic of a virtual machine is that its software is limited to the resources and abstractions provided by the virtual machine, such that the virtual machine cannot escape the boundaries of its virtual environment. Virtual machines are classified into two different classifications: 1) a system virtual machine; or 2) a process virtual machine. A system virtual machine provides a complete system platform that supports the execution of an entire operating system and emulates an existing architecture. With a system virtual machine, multiple operating system environments can co-exist on a same computer in isolation from each other. A system virtual machine can provide an instruction set architecture that is different from that of the real machine. A process virtual machine supports a single process and is typically portable and flexible. A process virtual machine runs as a normal application inside a host operating system and provides a platform-independent programming environment that allows a program to execute in a same manner on any platform.

A VM includes an operating system (OS) or application that is executed in the context of software called a hypervisor. A hypervisor emulates, or virtualizes, dedicated hardware. A hypervisor executes on a computer and receives a request to launch a virtual machine. The request includes a pointer (e.g., a path name) to an image that is to be used. The hypervisor retrieves the image, creates a volume from the contents of the image, and then launches a controlled execution environment which executes a bootloader stored on the volume created. The VM executes under the control of the hypervisor, and many virtual machines can be executed on a single physical machine. Each VM typically has its own copy of the operating system and all components required to run the operating system and the applications therein.

Virtual Network Functions (VNFs) include network functions that have been moved out of dedicated hardware devices into software that runs on commodity hardware. VNFs may be executed as one or more VMs on top of the hardware networking infrastructure. VNFs can be considered to be building blocks and can be connected or combined together to provide multiple capabilities required to complete a networking communication service(s). For example, VNFs can be linked together in a process known as service chaining. Traditionally, new network services and functions have been installed manually and configured within dedicated hardware devices. VNFs, however, eliminate the need for specific hardware since new functions can be quickly deployed as one or more VMs. VNFs typically increase network scalability and agility, while enabling better use of network resources. VNFs additionally reduce power consumption and reduce the use of available physical space due to VNFs replacing physical hardware. VNFs, thus, reduce operational and capital expenditures. Examples of various virtual network functions include switches, routers, servers, tunneling gateway elements, traffic analysis functions, mobile network nodes (e.g., Home Location Register (HLR), Home Subscriber Server (HSS), Mobility Management Entity (MME), Serving General Packet Radio Services (GPRS) Support Node (SGSN), Gateway GPRS Support Node (GGSN), Packet Data Network (PDN) gateway), and security functions (e.g., firewalls, intrusion detection systems, virus scanners, spam protection).

BRIEF DESCRIPTION OF THE DRAWINGS

FIGS. 1A-1D are diagrams that depict an overview of an auto-registration process for declaring and registering a new VNF with an Open Networks Automation Platform using a bus-based system;

FIG. 2 is a diagram that depicts an exemplary network environment in which the auto-registration process for declaring and registering a new VNF with the Open Networks Automation Platform of FIGS. 1A-1D may be implemented;

DETAILED DESCRIPTION OF THE PREFERRED EMBODIMENTS

Figure 3:
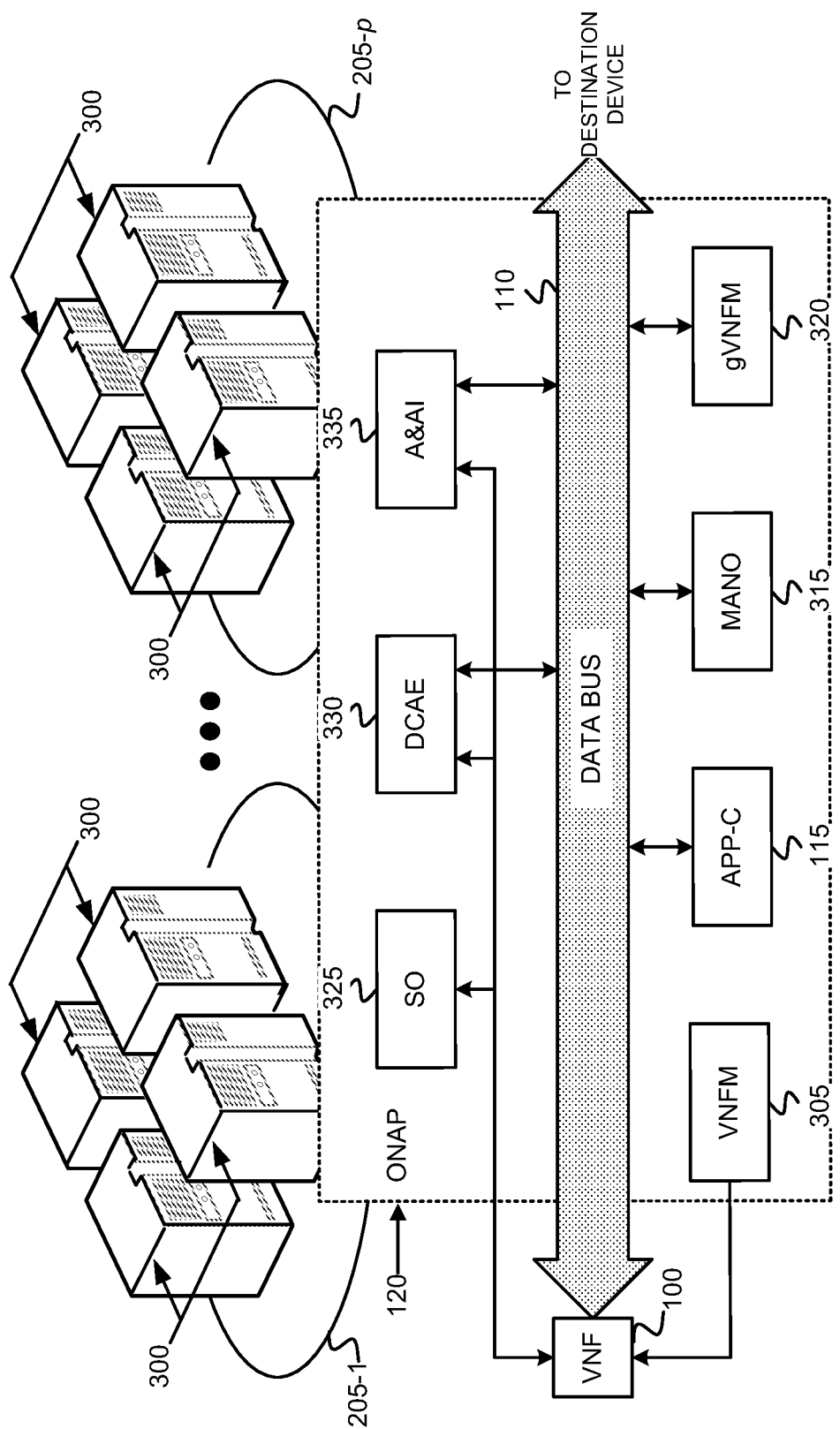
FIG. 3 is a diagram that depicts components of the Open Networks Automation Platform of FIG. 2 that may execute in one or more server clusters.

The following detailed description refers to the accompanying drawings. The same reference numbers in different drawings may identify the same or similar elements. The following detailed description does not limit the invention.

Virtual Network Functions (VNFs) are components of an overall network functions virtualization (NFV) architecture. NFV is an initiative to virtualize network services traditionally run on proprietary, dedicated hardware. With NFV, network service functions are packaged as VMs on commodity hardware. One example of an NFV architecture includes the Open Networks Automation Platform (ONAP) architecture. The ONAP provides a common platform for real-time, policy-driven orchestration and automation of physical network and virtual network functions that enables the rapid deployment, automation, and lifecycle management of new services using VNFs. The ONAP enables VNFs, and other network functions and services, to be interoperable in an automated, real-time environment. Therefore, with ONAP, network operators can synchronously orchestrate physical and virtual network functions. The ONAP's run-time environment executes the rules and policies distributed by a design and creation environment, and executes controllers that orchestrate, monitor, and manage the physical and virtual network functions and services.

As networks move to a Software Defined Network (SDN) model, and dedicated hardware components are replaced by VNFs, new methods are needed to allow VNFs to register themselves, and their capabilities, so that other components can utilize, manage, and monitor the VNFs. Resources in a network are dynamic and new VNFs need to be added, and old VNFs need to be removed, often depending on the needs of the network and the network's evolution. For example, a new version of a VNF, having new features and/or capabilities relative to an existing version of the VNF, may need to be added via the ONAP. As another example, a new functionality may need to be added by combining two previous VNFs, or splitting an existing VNF into multiple smaller components. When such new VNFs are added into the system, the ONAP control components need to know how to manage and monitor the new VNFs. Exemplary embodiments described herein enable new VNFs to declare themselves, and ONAP controlling components to discover how to manage, control, and/or monitor the new VNFs.

FIGS. 1A-1D are diagrams that depict an overview of an auto-registration process for declaring and registering a new VNF with an ONAP using a bus-based system such as, for example, a Data Movement as a Platform (DMaaP) system. FIG. 1A depicts a new VNF 100 beginning the auto-registration process by publishing VNF registration data to a Declare Topic 105 of a data bus 110. Though described herein in the context of an ONAP architecture/system, the exemplary embodiments may be applied to any type of network functions virtualization (NFV) architecture/system that orchestrates, automates, and manages services using VNFs. In one implementation, data bus 110 includes a Data Movement as a Platform (DMaaP) system that provides a data movement service that transports and processes data from any source to any target. One example of a DMaaP system includes a Kafka Bus that further includes a distributed streaming platform that publishes streams of records from contributors to consumers, stores the streams of records in a fault-tolerant durable manner, and processes the streams of records as they occur. A Kafka bus runs as a cluster of one or more servers that stores streams of records in categories called topics. Each record may include a key, a value, and a timestamp. In a data bus, such as a Kafka bus, a contributor publishes a stream of records to one or more topics. A consumer subscribes to the one or more topics, and selectively retrieves records of subscribed topics for consumption.

As shown in FIG. 1A, to begin the auto-registration process, a new VNF 100 publishes registration data to the Declare Topic 105 of data bus 110, where the registration data informs the ONAP 120 of multiple aspects of the VNF 100 that the ONAP 120 needs to know to manage, control, and/or monitor the new VNF 100. In one implementation, the registration data includes VNF configuration parameters, VNF control parameters, and/or VNF monitoring parameters. The VNF configuration parameters indicate specific parameters or properties required by a VNF to operate in a current environment. The VNF configuration parameters may include, for example, the types of inputs, outputs, CPU, memory, and other parameters, and an indication of how these parameters would be used. In the case of inputs and outputs, the VNF configuration parameters may include a type of inputs and outputs of the new VNF and how those inputs and outputs would be used and from where they would be sourced.

The VNF control parameters or properties include parameters required to change the operation of the VNF to deal with different situations. For example, the VNF control parameters may include control ports, control parameters, buffer sizes, routing regions, antenna angles, types of severity errors, how the severity errors are to be managed, and other parameters.

The VNF monitoring parameters include status information generated by the VNF that helps the ONAP 120 monitor the performance of the VNF. The VNF monitoring parameters may include, for example, types of errors flags, VNF status information, and other types of parameters. Subsequent to publication of the registration data to the Declare Topic 105 of data bus 110, app-C 115 (or an equivalent function) of the ONAP 120 reads and consumes the registration data from the data bus 110 such that the app-C 115 becomes informed about the VNF configuration parameters, the VNF control parameters, and/or the VNF monitoring parameters of the new VNF 100.

Based on consumption of the published registration data from the new VNF 100, app-C 115 of the ONAP 120 publishes, as shown in FIG. 1B, VNF configuration instructions to a VNF Configuration Topic 125 of data bus 110. The VNF configuration instructions include data specifying which topics the new VNF 100 should contribute to, and what information that the new VNF 100 should publish to which of the topics of the data bus 110. Subsequent to publication of the VNF configuration instructions to VNF Configuration Topic 125 of data bus 110, the new VNF 100 reads and consumes the VNF configuration instructions from the data bus 110 such that the VNF 100 becomes aware of the app-C 115's instructions.

App-C 115 of the ONAP 120 additionally, based on consumption of the registration data from the new VNF 100, publishes, as shown in FIG. 1C, ONAP component configuration data to the Consumer Configuration topic 130 of data bus 110. The ONAP component configuration data includes instructions that define which part(s) of the new VNF 100 is to be managed, controlled, and/or monitored by which assigned ONAP component. ONAP components 135, such as a generic Virtual Network Function Manager (gVNFM), a Management and Orchestration (MANO) component, and a Data Collection, Analytics, and Events (DCAE) component, read and consume the ONAP component configuration data published for each component such that each ONAP component learns which part or parts of the new VNF 100 that the particular ONAP component is assigned to manage, control, and/or monitor. The gVNFM, the MANO component, and the DCAE component are described in further detail below.

Based on consumption of the published ONAP component configuration data, each of the ONAP components, as depicted in FIG. 1D, begins managing, controlling, and/or monitoring 140 the new VNF 100. For example, each of the ONAP components 135 including the gVNFM, the MANO component, and the DCAE component, control, manage, and/or monitor particular parts of the VNF 100 specified by the ONAP component configuration data. Management, monitoring, and control functions may be performed by the ONAP components through usage of data bus 110, and not through a direct interface.

FIG. 2 is a diagram that depicts an exemplary network environment 200 in which the process for declaring and registering a new VNF with the ONAP 120 of FIGS. 1A-1D may be implemented. As shown, network environment 200 includes server clusters 205-1 through 205-*p* (where p is greater than or equal to one), server clusters 210-1 through 210-*q* (where q is greater than or equal to one), and a network(s) 220.

Server clusters 205-1 through 205-*p* (individually and generically referred to herein as "server clusters 205" or "server cluster 205") may each include a cluster of multiple servers, such as, for example, multiple interconnected network devices. Each one of the servers of a server cluster 205 may include a network device, such as a network connected computer, into which components of ONAP 120 may be deployed. Therefore, the various components of ONAP 120 may run in multiple different servers of one or more server clusters 205. Each of server clusters 205 may, for example, include a data center. Server clusters 205 may each connect, either directly or indirectly, to network(s) 220. In some embodiments, each server of server clusters 205 may connect directly to network 220, or may connect indirectly to network 220 via another network (e.g., via a local area network (LAN)(not shown)).

Server clusters 210-1 through 210-*q* (individually and generically referred to herein as "server clusters 210" or "server cluster 210") may each include a cluster of multiple servers, such as, for example, multiple interconnected network devices. Each one of the servers of a server cluster 210 may include a network device, such as a network connected computer, into which one or more VNFs 100 may be installed and executed. Therefore, each server cluster 210 may run at least one VNF 100, and ONAP 120 may monitor, manage, and/or control the VNFs 100 running at each server cluster 210 via network(s) 220. Each of server clusters 210 may, for example, include a data center. Server clusters 210 may each connect, either directly or indirectly, to network(s) 220. In some embodiments, each server of server clusters 210 may connect directly to network 220, or may connect indirectly to network 220 via another network (e.g., via a local area network (LAN)(not shown)).

Network(s) 220 may include one or more networks of various types including, for example, a Public Switched Telephone Network (PSTN), a wireless network, a LAN, a wide area network (WAN), a metropolitan area network (MAN), an intranet, or the Internet. The wireless network may include a satellite network, a Public Land Mobile Network (PLMN), or a wireless LAN or WAN (e.g., Wi-Fi).

The configuration of components of network environment 200 illustrated in FIG. 2 is for illustrative purposes. Other configurations may be implemented. Therefore, network environment 200 may include additional, fewer and/or different components that may be configured in a different arrangement from that depicted in FIG. 2.

FIG. 3 is a diagram that depicts components of ONAP 120 that may execute in server clusters 205-1 through 205-*p*. As shown, each of the server clusters 205 includes one or more servers 300 (four shown in each server cluster 205 by way of example) that include network connected computer devices. Each of servers 300 may also be referred to herein as a "network device 300." ONAP 120 may, as shown, include a Virtual Network Function Manager (VNFM) 305, an Application Controller (app-C) 115, a Management and Orchestration (MANO) component 315, a generic Virtual Network Function Manager (gVNFM) 320, a Service Orchestrator (SO) 325, a Data Collection, Analytics, and Events (DCAE) component 330, and an Active and Available Inventory (A&AI) component 335.

VNFM 305 may be dedicated to managing the lifecycle of a particular VNF(s) 100. VNFM 305 may, for example, activate, or decommission, VNFs 100, such as the VNF 100 shown in FIG. 3. App-C 115 executes processes that control the configuration of, apply real-time policies to, and control the state of distributed network components and services, including multiple different VNFs, such as VNF 100. MANO component 315 automates the operation of the components of ONAP 120. gVNFM 320 acts as a generic VNFM that manages the lifecycles of multiple designated VNFs 100.

SO 325 may automate sequences of activities, tasks, rules, and policies needed for on-demand creation, modification, or removal of network, application, or infrastructure services and resources. SO 325 provides orchestration at a high level, with an end-to-end view of the infrastructure, network, and applications.

DCAE component 330 collects performance, usage, and configuration data; provides computation of analytics; aids in troubleshooting; and publishes events, data, and analytics.

A&AI component 335 provides real-time views of a system's resources, services, products, and their relationships with each other. A&AI component 335 may be updated in real-time by app-C 115 as app-C 115 makes changes in the network environment (e.g., changes to VNFs 100).

The components of ONAP 120 publish data to, and consume data from, data bus 110 to perform various operations, as described further herein. VNF 100, shown in FIG. 3, represents a single VNF 100 that declares itself by registering with ONAP 120 via data bus 110.

The configuration of the components of ONAP 120 of FIG. 3 is for illustrative purposes only. Other configurations of ONAP 120 may be implemented. Therefore, ONAP 120 may include additional, fewer and/or different components, or differently arranged components, from those depicted in FIG. 3. Furthermore, the components of ONAP 120 depicted in FIG. 3 may perform additional, or different, operations or functions than those described above.

Figure 4:
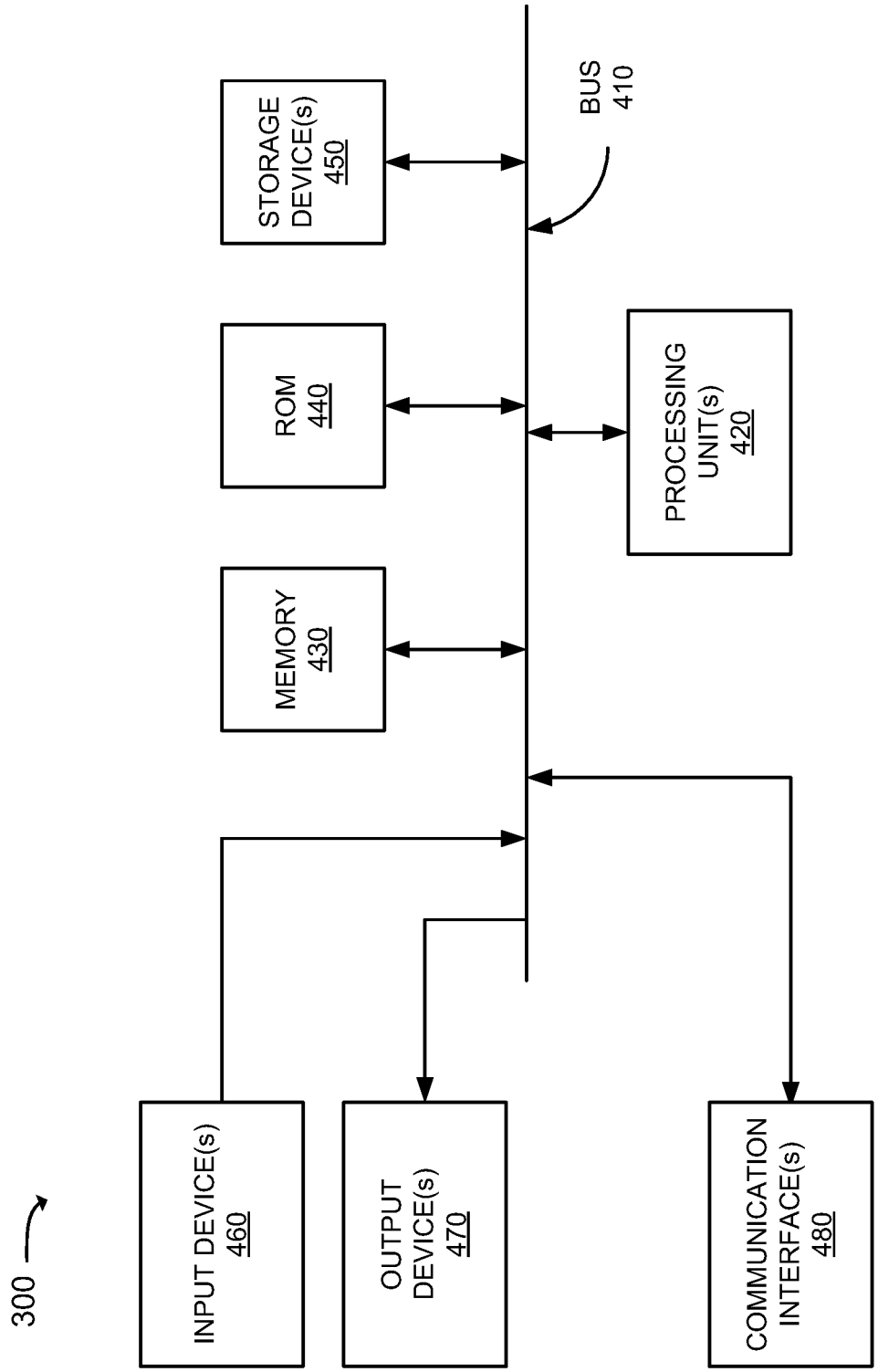
FIG. 4 is a diagram that depicts exemplary components of a network device of a server cluster.

FIG. 4 is a diagram that depicts exemplary components of a network device 300 of a server cluster 205 or 210. Network device 300 may include a bus 410, a processing unit 420, a main memory 430, a read only memory (ROM) 440, a storage device 450, an input device 460, an output device 470, and a communication interface 480. Bus 410 may include a path that permits communication among the elements of server 300.

Processing unit 420 may include one or more processors or microprocessors, or processing logic, which may interpret and execute instructions. Memory 430 may include a random access memory (RAM) or another type of dynamic storage device that may store information and instructions for execution by processing unit 420. Read Only Memory (ROM) 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "non-transitory computer-readable medium" or a "non-transitory storage medium."

Input device 460 may include one or more mechanisms that permit an operator (or user) to input information to network device 300, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface 480 may include one or more transceivers that enable network device 300 to communicate with other devices and/or systems. For example, communication interface 480 may include a wired or wireless transceiver for communicating with other network devices 300 of a same server cluster 205 or 210, a different server cluster 205 or 210, or ONAP 120, via network(s) 220.

The configuration of components of network device 300 illustrated in FIG. 4 is for illustrative purposes only. Other configurations may be implemented. Therefore, network device 300 may include additional, fewer and/or different components, or differently arranged components, from those depicted in FIG. 4.

Figure 5:
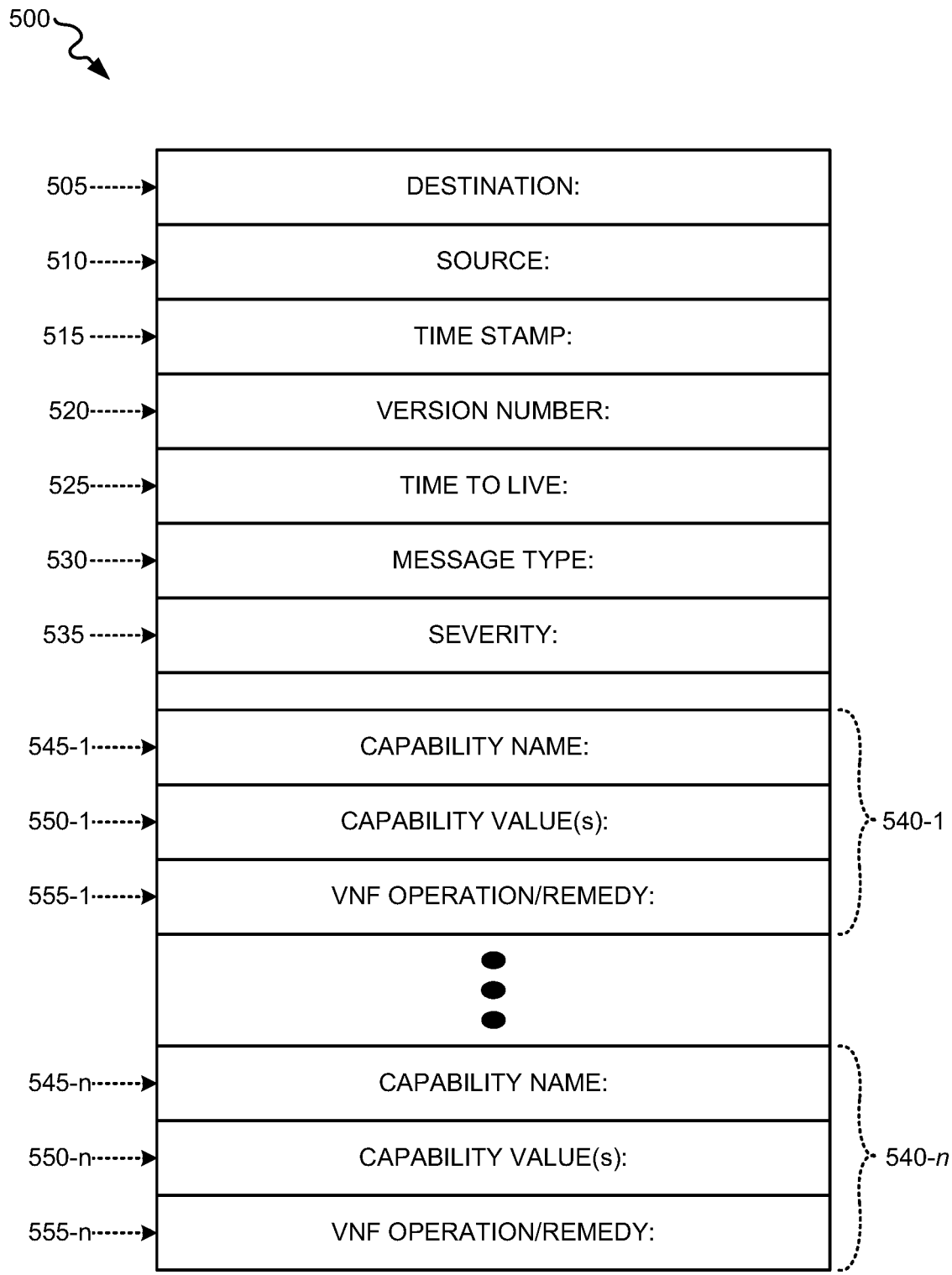
FIG. 5 depicts an exemplary format of a data unit that may be used for publishing data to, or consuming data from, the data bus of FIG. 3, regarding a particular VNF.

FIG. 5 depicts an exemplary format of a data unit 500 that may be used for publishing data to data bus 110, or for consuming data from data bus 110, regarding a particular VNF 100. Data unit 500 may include, for example, a packet, a datagram, a cells, a fragment or a combinations of packets, datagrams or cells, or another type of data. As shown, data unit 500 may include a destination field 505, a source field 510, a time stamp field 515, a version number field 520, a time to live field 525, a message type field 530, a severity field 535, and one or more capability fields 540-1 through 540-n.

Destination field 505 stores an address (e.g., Internet Protocol (IP) address, Medium Access Control address, ONAP component ID) or a label of the destination to which the data unit 500 is being sent. In some circumstances, the destination of the data unit 500 may be a particular topic of data bus 110. In other circumstances, the destination of the data unit 500 may be a VNF 100 (e.g., a message from app-C 115 to the VNF 100), or may be a component(s) of ONAP 120 (e.g., app-C 115, MANO 315, A&AI 335, gVNFM 320, VNFM 305, and/or DCAE 330).

Source field 510 stores a unique identifier (ID), label or name, ONAP component ID, or address of a node (e.g., VNF 100, app-C 115) that generated the data unit 500. Time stamp field 515 stores data that indicates a time, such as a date and time in hours:minutes:seconds format, when the data unit 500 was created. Version number field 520 stores data indicating a version number of, for example, the VNF 100 with which the data unit 500 is concerned. The version number field 520 may be set to a null value in a circumstance where the version number may be irrelevant.

Time to live field 525 stores data that indicates a length of time during which the data unit 500, and its contents, will be valid. For example, the data stored in field 525 may indicate a time in seconds, minutes, hours, or days.

Message type field 530 stores data indicating a type of message included in the data unit 500. The various types of messages may include configuration, error, status, or log messages. Other types of messages may, however, be stored in field 530.

Severity field 535 stores data that indicates a severity level associated with control or error conditions. The severity level may, for example, range from 0 to 3 (i.e., 0, 1, 2, 3), with 0 being the most severe and 3 being the least severe. For error conditions, a severity level of 0 may indicate a server error and cause operations to halt, while a severity level of 3 may be a warning and may impact performance but not functionality.

Capability fields 540-1 through 540-n (where n may be greater than or equal to one) each store a group of data that specifies information about a particular capability of a VNF 100. The number of n capability fields 540 contained in a given data unit 500 may be equal to the number of capabilities that the VNF 100 has. Each capability field 540 may include a capability name subfield 545, a capability value(s) subfield 550, and a VNF operation/remedy subfield 555 for a given VNF 100. When data unit 500 is being sent from a source to a destination with a record offset number into a particular topic of data bus 110, then capability name subfield 545 stores the name of the particular topic of data bus 110, and capability value subfield 550 stores the record offset number into the particular topic.

Capability name subfield 545 stores data identifying a name of a particular capability of a VNF 100. Capability value(s) subfield 550 stores data identifying values associated with the particular capability named in subfield 545. The values may, for example, identify a normal value, a maximum value, and a minimum value of the particular capability. VNF operation/remedy subfield 555 stores data that identifies an action to be taken by an ONAP component in case of an error or warning associated with the operation of a VNF 100. The data identifying the action to be taken in case of an error or warning enables the ONAP component(s) to automate the handling of a given error or warning.

Figure 6:
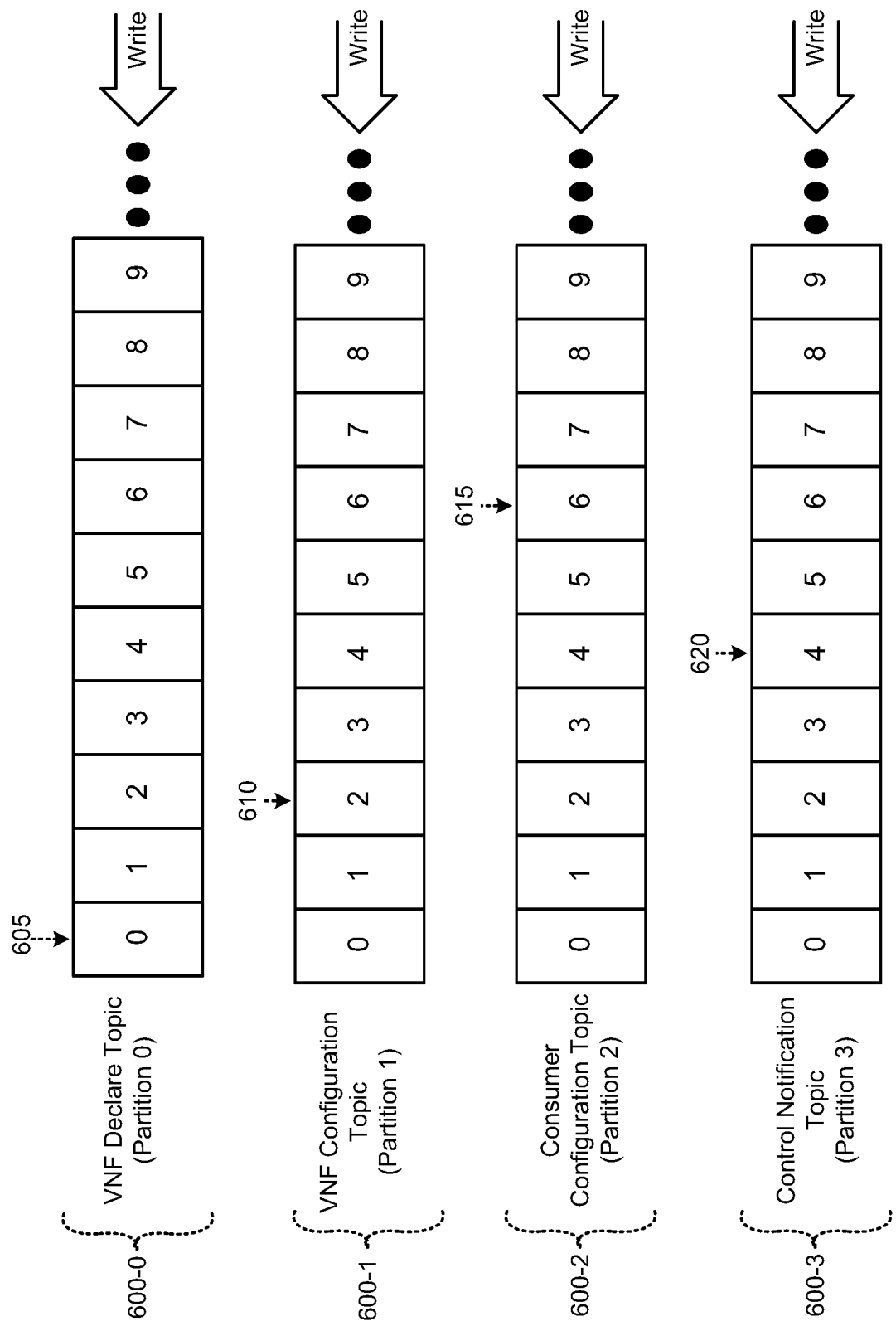
FIG. 6 depicts the publishing of data to the data bus of FIG. 3, according to one exemplary implementation, via one or more topics/categories for consumption by VNFs and/or components of the Open Networks Automation Platform.

FIG. 6 depicts the publishing of data to data bus 110, according to one exemplary implementation, via one or more topics/categories for consumption by VNFs 100 and/or components of ONAP 120. In the implementation shown, data bus 110 may include multiple partitioned logs, with each partition of the partitioned log being associated with a different topic/category. In the implementation shown, data bus 110 includes four partitioned logs, including a partition 0 600-0, a partition 1 600-1, a partition 2 600-2, and a partition 3 600-3. Data bus 110, however, may include a partitioned log having any number of partitions. Each partition of the partitioned log includes an ordered sequence of records to which each new record is appended as data is published to the partition (shown as a "write" operation at the right side of each partition 600 in FIG. 6). Each record in the partition may be assigned a sequential identification number, called an offset, that uniquely identifies each record within the partition. For example, in FIG. 6, offset 0 in partition 600-0 is indicated at 605, offset 2 into partition 600-1 is indicated at 610, offset 6 into partition 600-2 is indicated at 615, and offset 4 into partition 600-3 is indicated at 620. Each record in each partition 600 of data bus 110 may store a block of data that is specific to the topic, or category, associated with that partition 600. Data bus 110 durably persists records published to a partition of the partitioned log, whether or not the records have been consumed by the appropriate clients (i.e., a single record may be consumed by more than one client), using a configurable retention period. Each record of a partition is available for consumption during the duration of the configurable retention period for that record.

In the implementation depicted in FIG. 6, partition 0 600-0 of the partitioned log is associated with a "VNF Declare Topic." The "VNF Declare Topic" enables a VNF 100 to declare itself as being active, and to publish the capabilities of VNF 100 to components of ONAP 120. Therefore, a new VNF 100 publishes its capabilities to a record of the "VNF Declare Topic" of partition 0 for consumption by ONAP 120 (e.g., by app-C 115).

Partition 1 600-1 of the partitioned log is associated with a "VNF Configuration Topic." The "VNF Configuration Topic" enables components of ONAP 120 (e.g., app-C 115) to publish data that indicates which topics a new VNF 100 should contribute to, and which VNF information of VNF 100 should be contributed to which topic. After ONAP 120 publishes data to a record of the "VNF Configuration Topic" for a particular new VNF 100, the VNF 100 may consume (e.g., retrieve and read) the record from the partition 600-1 of data bus 110.

Partition 2 600-2 of the partitioned log is associated with a "Consumer Configuration Topic." The "Consumer Configuration Topic" enables the app-C 115 of ONAP 120 to inform other components of ONAP 120 (e.g., gVNFM 320, MANO 315, or SO 325) about which aspect or aspects of a VNF 100 that is/are to be managed, monitored, and/or controlled by that particular ONAP component. After app-C 115 publishes data to a particular record of the "Consumer Configuration Topic," the target ONAP component retrieves and consumes the data from the record to determine what aspect(s) of the VNF 100 that the ONAP component is to manage, monitor, and/or control.

Partition 3 600-3 of the partitioned log is associated with a "Control Notification Topic." The "Control Notification Topic" enables the components of ONAP 120 (e.g., gVNFM 320, MANO 315, or SO 325) to notify the app-C 115 that a particular VNF has been decommissioned/de-registered by that ONAP component. After a particular ONAP control component publishes a decommissioned/de-registration completion notification to a particular record of the "Control Notification Topic," the destination app-C 115 retrieves and consumes the notification data from the record. Each ONAP control component, upon completion of decommissioning/de-registration of a VNF 100, publishes its own completion notification to the Control Notification Topic of the partitioned log 600-3.

Figure 7:
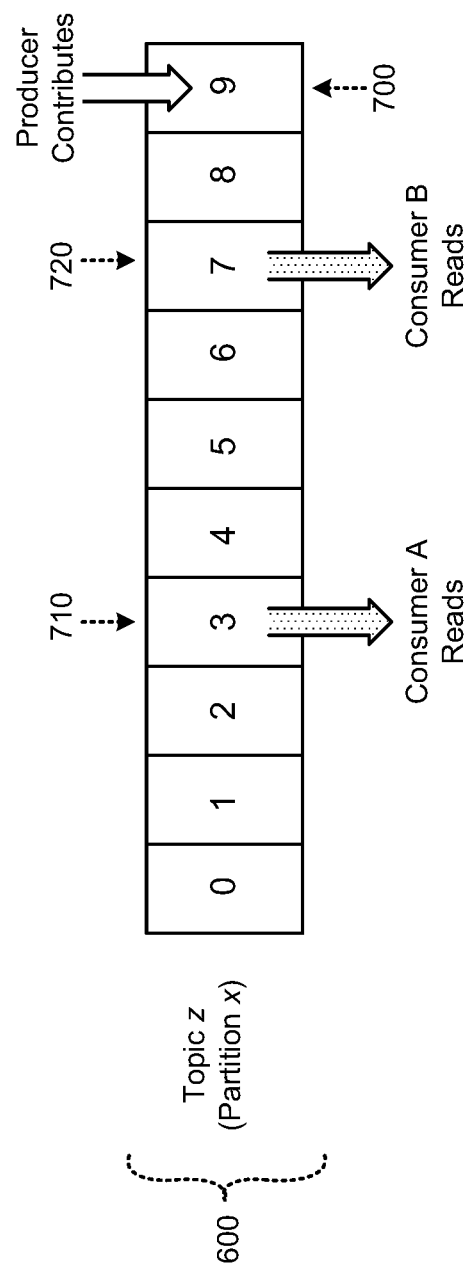
FIG. 7 illustrates examples of records being published to, and read and consumed from, a generic partition x of data bus 110 that is associated with a generic topic z.

FIG. 7 illustrates examples of records being published to, and read and consumed from, a generic partition x of data bus 110 that is associated with a generic topic z. As shown, a producer or contributor (not shown) sends data to data bus 110 for publishing and, upon receipt, data bus 110 appends a new record 700, containing the published data, to the sequence of existing records of partition 600 of the partitioned log of data bus 110. Consumer A may then retrieve and consume a record from data bus 110 by, as depicted in FIG. 7, reading record "3" 710 from partition 600. Additionally, as shown, Consumer B may also retrieve and consume a record from data bus 110 by reading record "7" 720 from partition 600. In some circumstances, Consumer A and Consumer B may be different entities (e.g., app-C 115 and MANO 315), but in other circumstances Consumer A and Consumer B may be the same entity (e.g., a same VNF 100).

Figure 8:
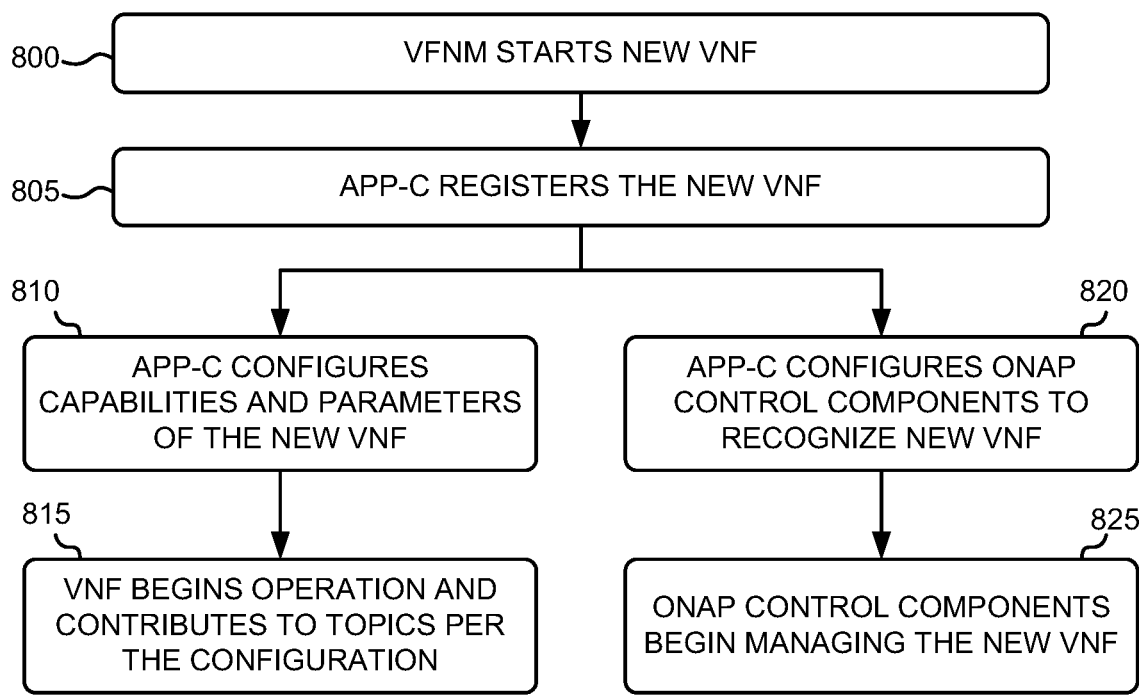
FIG. 8 is a flow diagram that illustrates an exemplary process declaring and registering a new VNF with the Open Networks Automation Platform.

FIG. 8 is a flow diagram that illustrates an exemplary process declaring and registering a new VNF 100 with ONAP 120. The exemplary process of FIG. 8 may be implemented by components of ONAP 120, in conjunction with a new VNF 100, when the new VNF 100 is to be registered and activated for service use. The exemplary process of FIG. 8 is described with reference to the example data bus diagrams of FIGS. 10, 12A, 12B, and 14, and the messaging/operations diagram of FIG. 15.

Figure 15:
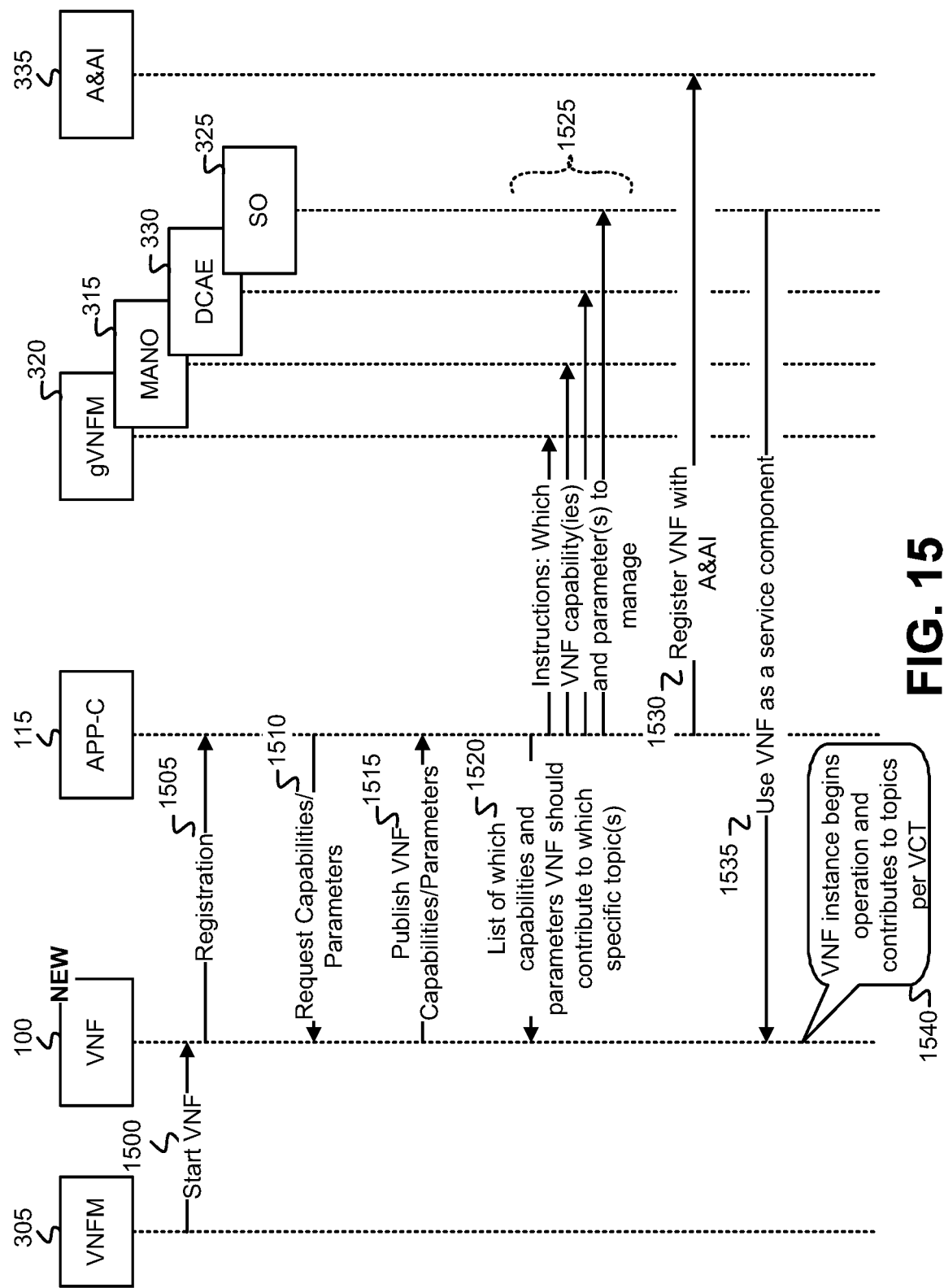
FIG. 15 depicts an exemplary messaging and operations diagram associated with the process of FIG. 8.

The exemplary process includes VFNM 305 starting a new VNF 100 (block 800). VNFM 305 may be informed when a new VNF 100 has been installed within a server cluster 210. Referring to FIG. 15, VFNM 305 may initiate the VNF registration process by sending a message 1500 to VNF 100 that causes VNF 100 to start the VNF registration and configuration process with ONAP 120.

Figure 9:
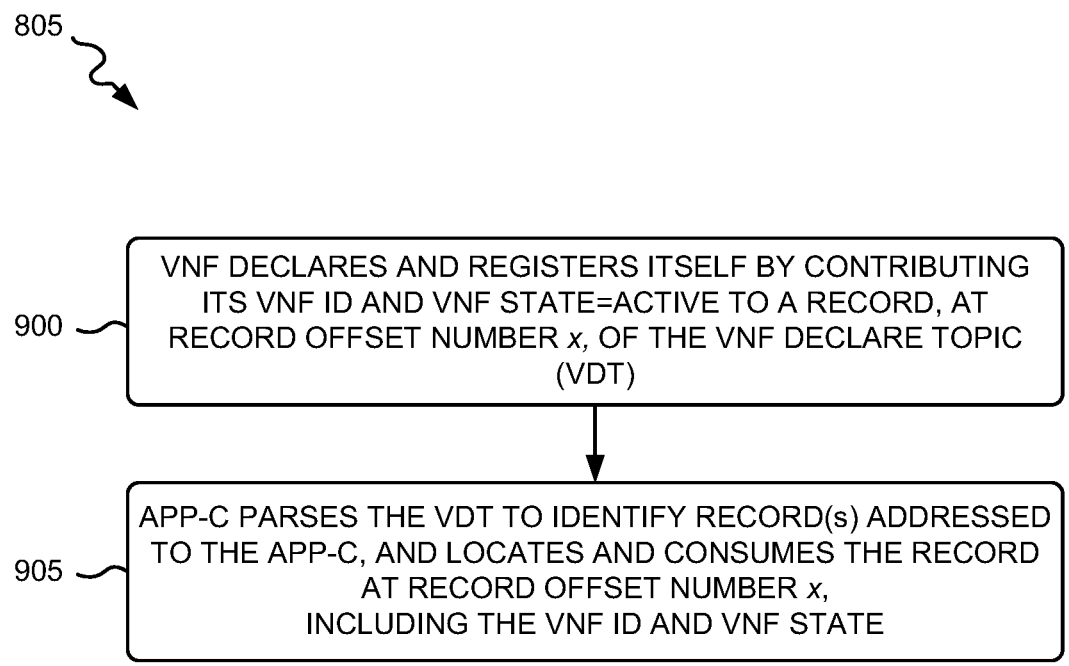
FIG. 9 depicts one exemplary implementation of the VNF registration of block 805 of FIG. 8 in which VNF registration is performed via a data bus.
Figure 10:
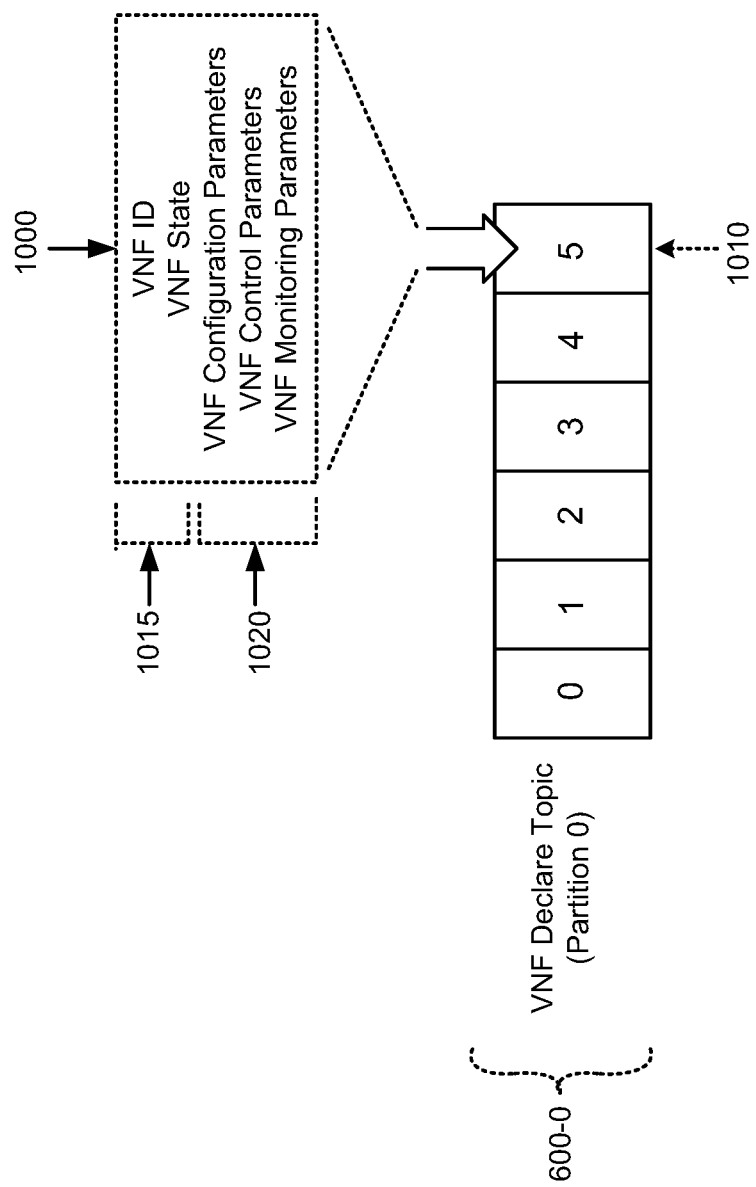
FIG. 10 depicts an example of a new VNF acting as a contributor and publishing its VNF registration information to the VNF Declare Topic of the data bus.

App-C 115 of ONAP 120 registers the new VNF 100 (block 805). Registration of the new VNF 100 with ONAP 120 enables components of ONAP 120 to manage, monitor, and/or control the VNF 100. One exemplary implementation of the VNF registration of block 805, in which VNF registration is performed via data bus 110, is described with respect to FIG. 9. Referring to the exemplary implementation of FIG. 9, new VNF 100 declares and registers itself by contributing its VNF ID and VNF state (VNF state=active) to a record, at record offset number x of the VNF Declare Topic (VDT) 600-0 (where "x," in the context of block 900, refers to a next sequential record in the sequence of records of the partitioned log of VDT 600-0) (block 900). Referring to FIG. 6, if record offset number 2 was the last sequential record to which data was contributed, then record offset number x of the VDT 600-0, in block 900, would be the next sequential record 3 in which the new VNF 100 would contribute its VNF ID and VNF state. The VNF's VNF ID may uniquely identify the new VNF among other VNFs. The VNF state may identify one of multiple different states that the new VNF 100 is currently in (e.g., active, ready, decommissioned). In this circumstance, where the new VNF 100 is initially registering itself, the VNF state would equal "active." FIG. 10 depicts an example of a new VNF 100 (not shown) acting as a contributor and publishing its VNF registration information 1000 to the VNF Declare Topic (Partition 0) 600-0 of data bus 110. As shown in FIG. 10, the new VNF 100's VNF registration information 1000 is appended to the next record 1010 (record offset 5) in the sequence of records in the partitioned log. For example, the VNF ID and VNF state 1015 is written, by VNF 100, into the record 1010 of the partitioned log. The registration information 1000 may additionally include (but not shown in FIG. 10) a component ID of app-C 115 that enables app-C 115, when parsing the record containing the information 1000, to identify that the information 1000 is addressed to app-C 115.

App-C 115 parses the VDT 600-0 to identify a record(s) addressed to the app-C 115, and locates and consumes the record at record offset number x from VDT 600-0 (at the record offset number to which data was contributed by VNF 100 in block 900), including reading the VNF ID and the VNF state contributed to the record by the new VNF (block 905). App-C 115 locates a record(s) addressed to the app-C 115 within VDT 600-0, and, referring to the example of FIG. 10, reads the VNF ID and VNF state information from the record 1010. The VDT 600-0, therefore, enables to the VNF to pass registration information to app-C 115. Referring to FIG. 15, the new VNF 100 passes registration information 1505 to app-C 115 via VDT 600-0 (not shown in FIG. 15).

Figure 11A:
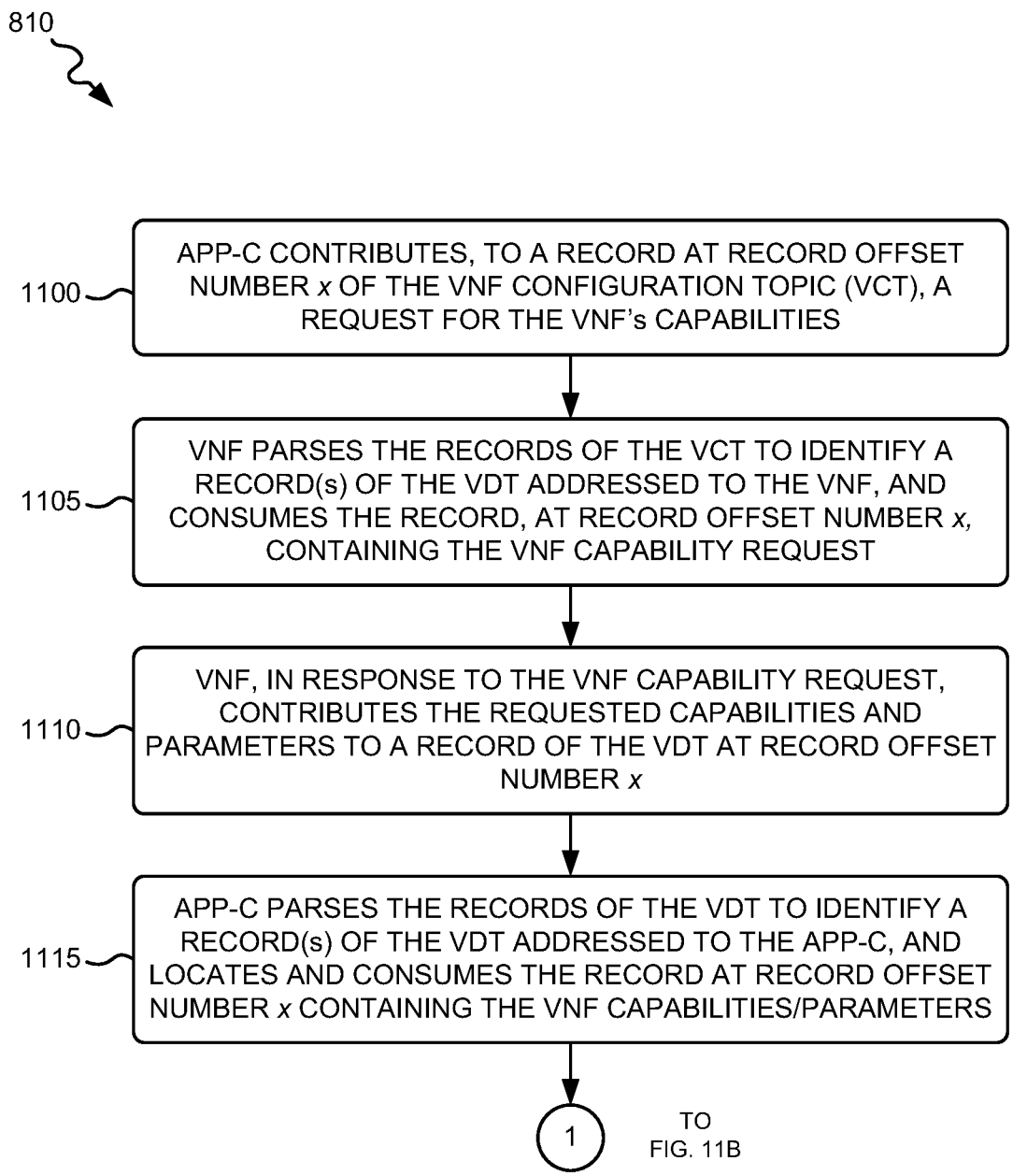
FIGS. 11A and 11B depict one exemplary implementation of the VNF capabilities and parameters configuration of block 810 of FIG. 8.

Returning to FIG. 8, app-C 115 of ONAP 120 configures the capabilities and parameters of the new VNF 100 (block 810). One exemplary implementation of the VNF capabilities and parameters configuration of block 810 is described with respect to FIGS. 11A and 11B. Referring to FIG. 11A, app-C 115 contributes, to a record of the VNF configuration Topic (VCT) 600-1 at a record offset number x (where "x," in the context of block 1100, refers to a next sequential record in the sequence of records of the partitioned log of VCT 600-1) a request for the new VNF 100's capabilities (block 1100) (FIG. 11A). Referring to FIG. 6, if record offset number 6 was the last sequential record to which data was contributed, then record offset number x of the VCT 600-1, in block 1100, would be the next sequential record 7 in which app-C 115 contributes its request for the new VNF 100's capabilities. FIG. 12A depicts an example of app-C 115 publishing a VNF capabilities request 1200 to the VCT (Partition 1) 600-1 of data bus 110. As shown in FIG. 12A, the VNF capabilities request 1200 is written to the next record 1210 (e.g., record offset 7 in the example shown) in the sequence of records in the partitioned log. The VNF capabilities request 1200 includes a VNF ID of the VNF 100 to which the request is directed, and a code that indicates that the new VNF 100 should inform the ONAP 120 of its capabilities and parameters. Referring to FIG. 15, the app-C 115 requests 1510 the VNF 100's capabilities and parameters via VCT 600-1 (not shown in FIG. 15).

Returning to FIG. 11A, VNF 100 parses the records of the VCT 600-1 to identify a record(s) of the VCT 600-1 addressed to the VNF, and consumes the record, at record offset number x (where record offset number x is the record to which app-C 115 contributed in block 1100) containing the VNF capability request (block 1105). Referring to the example of FIG. 12A, VNF 100 parses the records of VCT 600-1 to locate the record 1210 at record offset number 7 that stores the request for capabilities 1200 addressed to the VNF.

In response to the request, VNF 100 contributes its VNF capabilities and parameters to the VNF Declare Topic 600-0 (partition 0) at a record offset number x (where "x," in the context of block 1110, refers to a next sequential record in the sequence of records of the partitioned log of VDT 600-0) (block 1110). Referring to FIG. 6, if record offset number 8 was the last sequential record to which data was contributed, then record offset number x of the VDT 600-0, in block 1110, would be the next sequential record 9 in which VNF 100 contributes its VNF capabilities and parameters. As shown in the example of FIG. 10, the VNF capabilities and parameters 1020, including VNF configuration parameters, VNF control parameters, and VNF monitoring parameters, are written to a record 1010 having a record offset number (e.g., 5) within the partitioned log of the VDT 600-0. The unique component ID of app-C 115 may additionally be written into the record 1010 to identify the record's destination.

App-C 115 parses the records of the VDT 600-0 (partition 0) to identify a record(s) addressed to the App-C 115, and locates and consumes the record at record offset number x (where record offset number x is the record to which the VNF contributed its capabilities and parameters in block 1110) containing the VNF capabilities and parameters (block 1115) (FIG. 11A). Referring to the example of FIG. 10, app-C 115 locates the record 1010, at record offset number 5 of VDT 600-0, addressed to the app-C 115, and reads the VNF capabilities and parameters 1020 from the record 1010. Referring to FIG. 15, the VNF 100 is shown publishing 1515 its capabilities and parameters to app-C 115 via VDT 600-0 (not shown in FIG. 15).

Figure 11B:
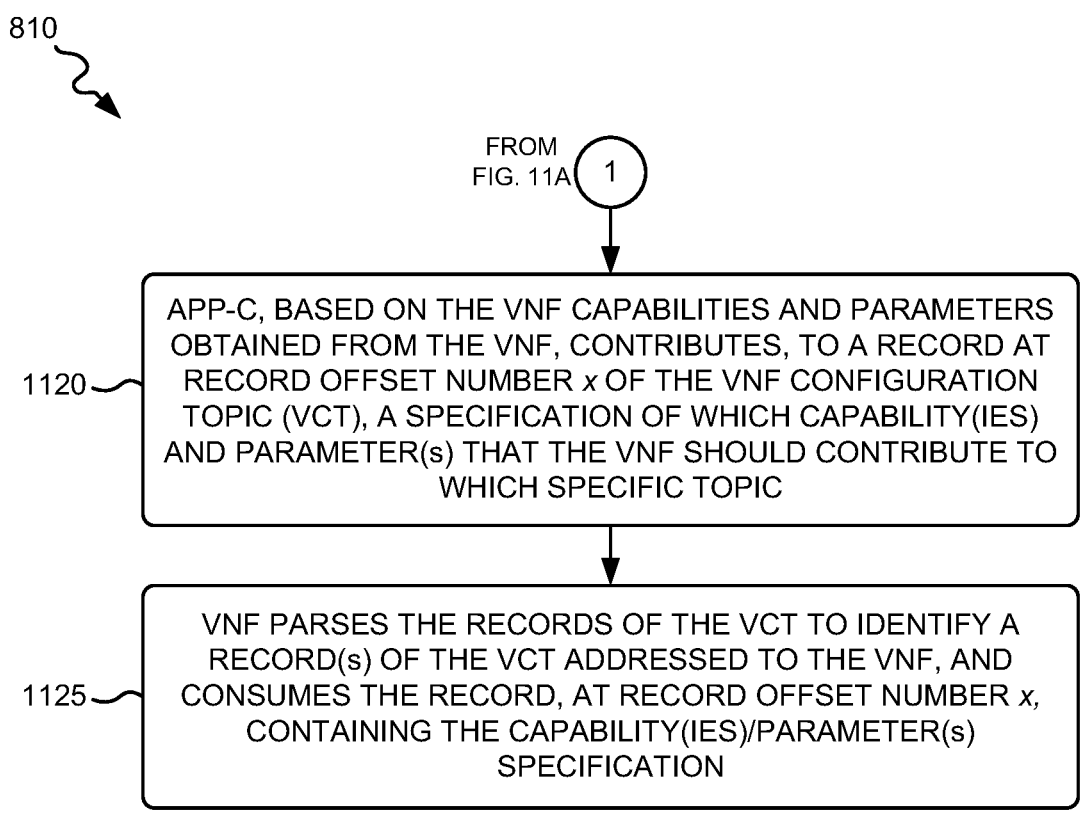
Figure 12A:
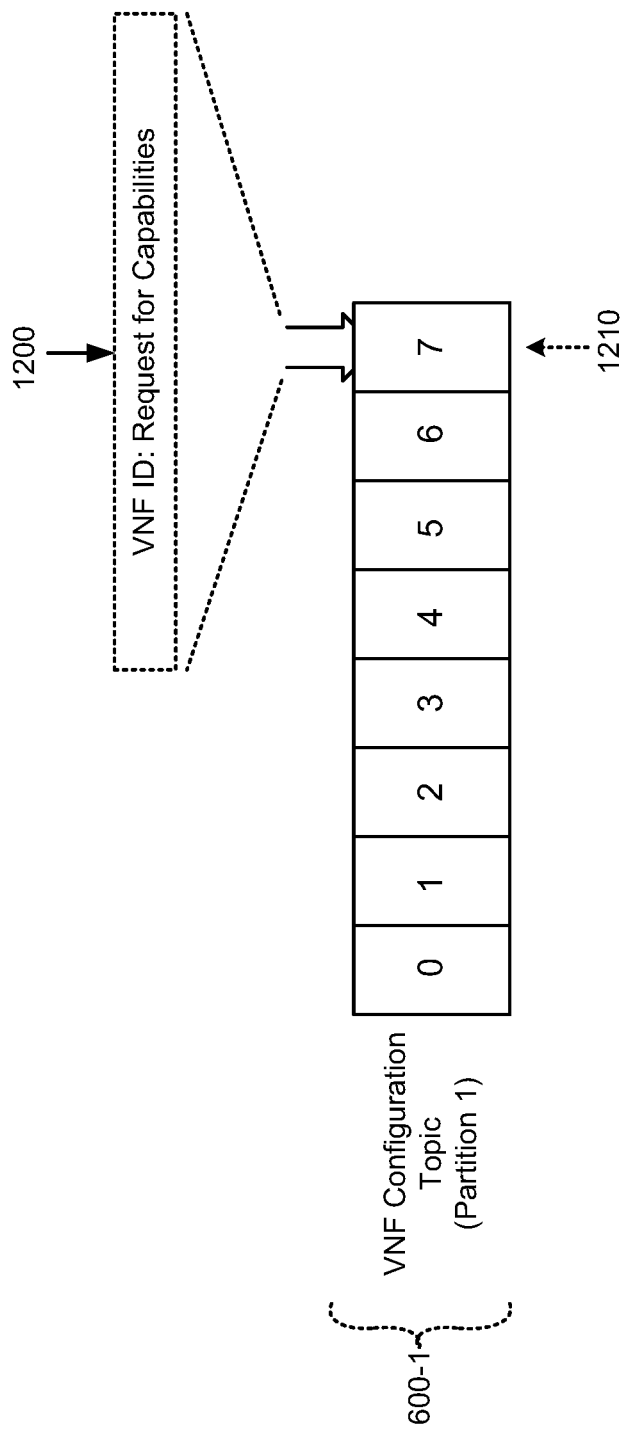
FIG. 12A depicts an example of the application controller of the Open Networks Automation Platform publishing a VNF capabilities request to a record of the partitioned log of the VNF Configuration Topic of the data bus.
Figure 12B:
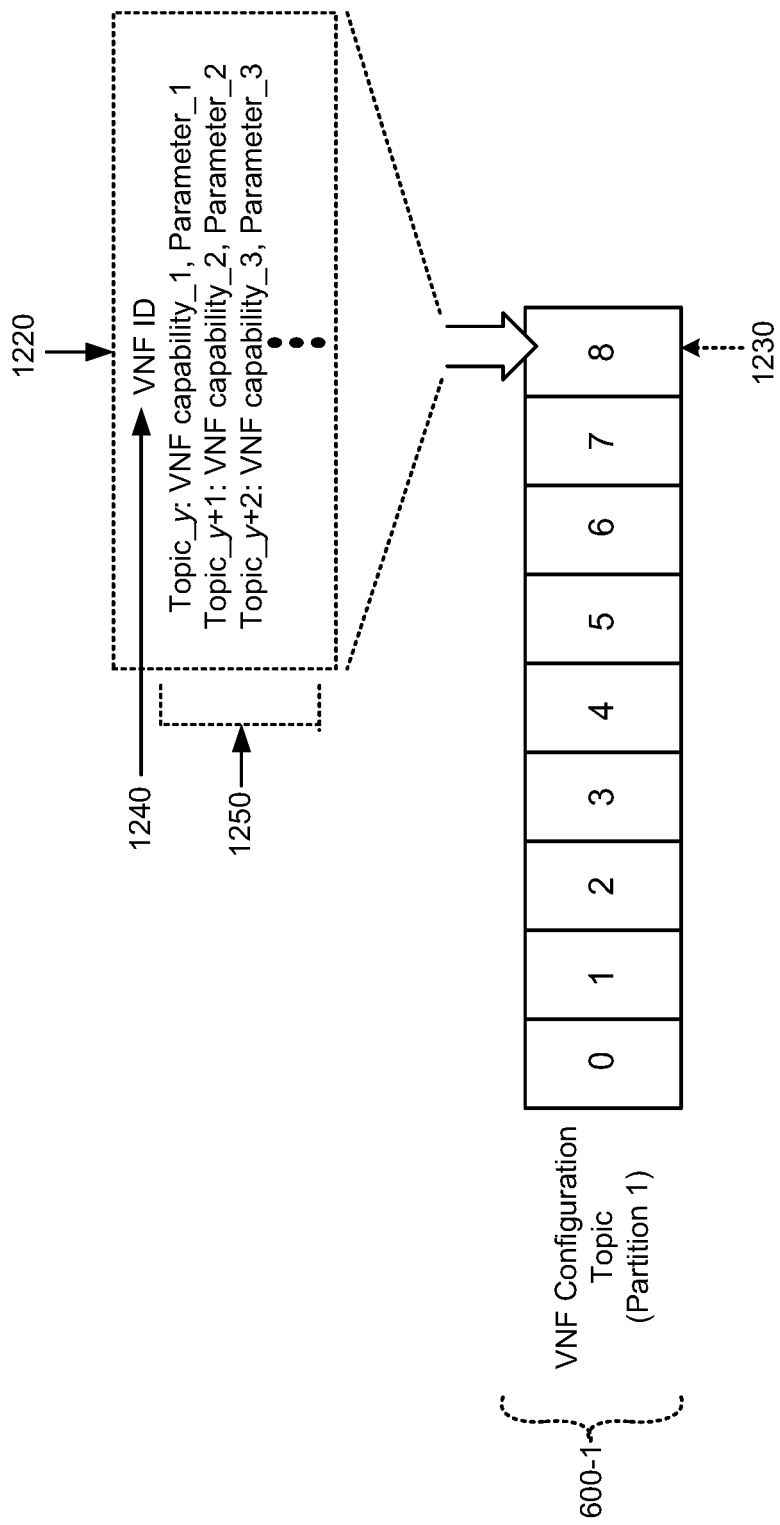
FIG. 12B depicts an example of a VNF publishing its requested capabilities and parameters to a record of the partitioned log of the VNF Configuration Topic of the data bus.

App-C 115, based on the VNF capabilities and parameters obtained from the new VNF 100, contributes, to a record of the VCT 600-1 at a record offset number x (where "x," in the context of block 1120, refers to a next sequential record in the sequence of records of the partitioned log of VCT 600-1), a specification of which capability(ies) and parameter(s) that the VNF 100 should contribute to which specific topic (block 1120) (FIG. 11B). Referring to FIG. 6, if record offset number 1 was the last sequential record to which data was contributed, then record offset number x of the VCT 600-1, in block 1120, would be the next sequential record 2 in which app-C 115 contributes its request for the new VNF 100's capabilities. The capability(ies)/parameter(s) specification contributed to the record of VCT 600-1 includes a list that maps each capability and parameter of the VNF 100 to a topic to which that capability and parameter should be contributed to (i.e., written to) by the VNF 100. Referring to the example of FIG. 12B, a VNF capabilities/parameters specification 1220 is written to a record 1230 of the partitioned log of VCT 600-1 at record offset number 8. The example capabilities/parameters specification 1220 of FIG. 12B includes a VNF ID 1240 that identifies to which VNF the record is addressed, and includes a mapping list 1250 that maps each capability and parameter of the VNF 100 to a topic to which that capability and parameter should be contributed. The mapping list 1250 example of FIG. 12B depicts topic_y as being mapped to VNF capability 1, and parameter_1; topic_y+1 to VNF capability_2 and parameter_2; topic_y+2 to VNF capability_3 and parameter_3, etc. Referring to FIG. 15, app-C 115 is shown providing a list 1520, of which capabilities and parameters the VNF 100 should contribute to which specific topic(s), to VNF 100 via VCT 600-1 (not shown in FIG. 15).

VNF 100 parses the records of the VCT 600-1 to identify a record(s) of the VCT 600-1 addressed to the VNF, and consumes the record, at record offset number x (where record offset number x is the record to which the app-C 115 contributed its specification in block 1120), containing the capability(ies)/parameter(s) specification (block 1125) (FIG. 11B). Referring to the example of 12B, VNF 100 reads the mapping list 1250 from record offset number 8 of VCT 600-1.

Returning to FIG. 8, VNF 100 begins operation, and contributes to topics of data bus 110 per the configuration (block 815). Referring to the example of FIG. 12B, during operation, VNF 100 contributes information to topics of data bus 110 per the previously consumed mapping list 1250 retrieved from VCT 600-1 that was addressed to the VNF 100. In the particular example of FIG. 12B, the VNF 100, during operation, would contribute data associated with VNF capability_1, and parameter_1 to topic_y; data associated with VNF capability_2, and parameter_2 to topic_y+1, data associated with VNF capability_3, and parameter_3 to topic_y+2, etc. Referring to FIG. 15, VNF 100 is shown beginning 1540 operation and contributing to the topics per the VCT 600-1 (not shown in FIG. 15).

Figure 13:
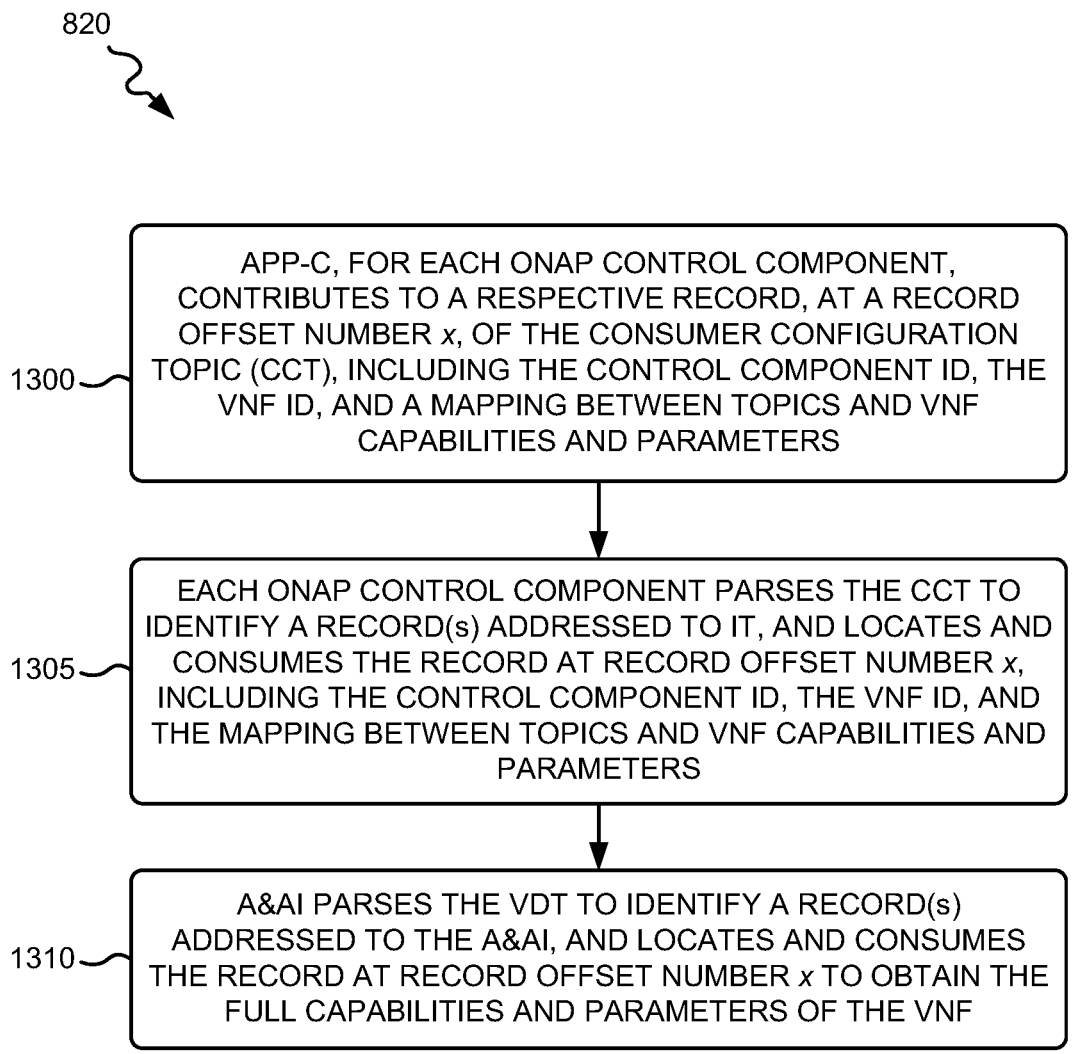
FIG. 13 depicts one exemplary implementation of the configuration of VNF capabilities and parameters of block 820 of FIG. 8.
Figure 14:
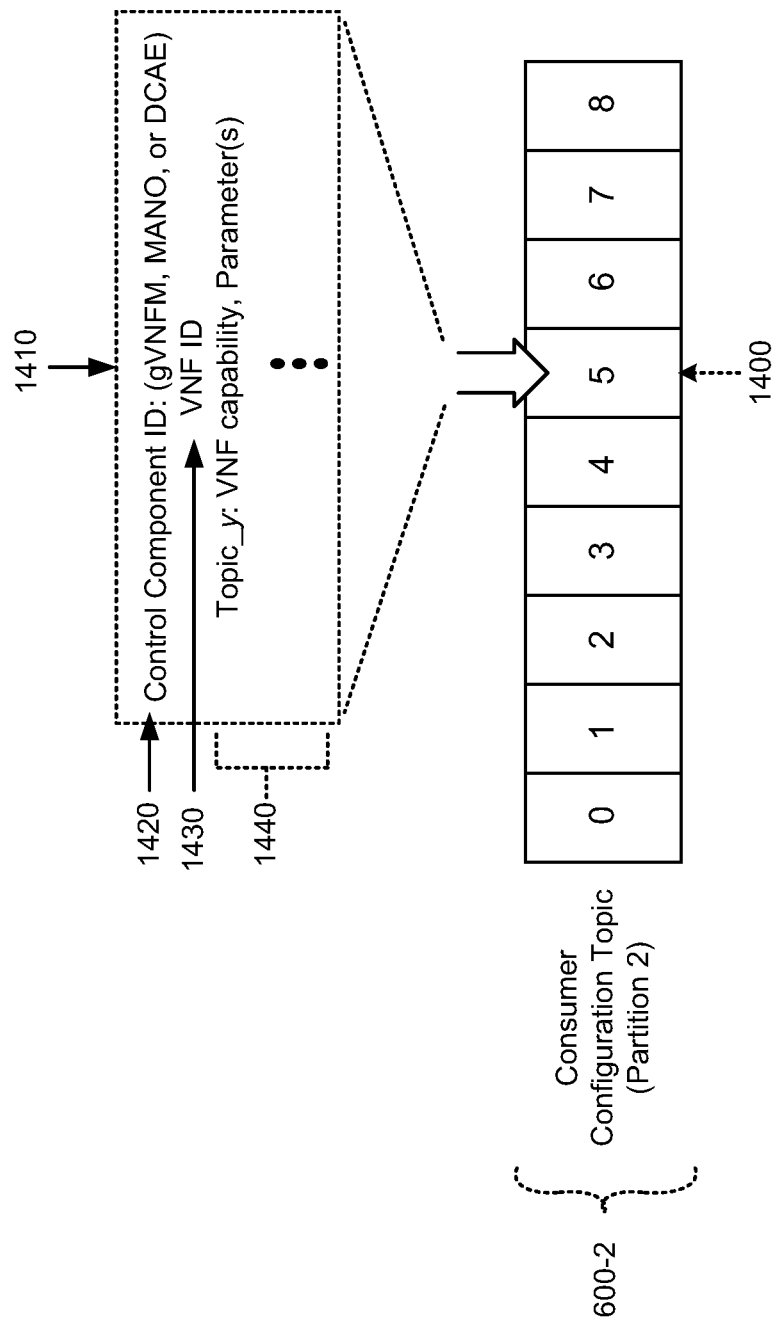
FIG. 14 depicts an example of Open Networks Automation Platform configuration data being contributed to a record of the partitioned log of the Consumer Configuration Topic of the data bus.

App-C 115 of ONAP 120 configures ONAP control components to recognize the new VNF (block 820). One exemplary implementation of the ONAP configuration of block 820 is described with respect to FIG. 13. As shown in FIG. 13, app-C 115, for each ONAP control component, contributes to a respective record of the Consumer Configuration Topic (CCT) 600-2, at a record offset number x (where "x," in the context of block 1300, refers to a next sequential record in the sequence of records of the partitioned log of CCT 600-2), including the control component ID, the VNF ID, and a mapping between topics and capabilities and parameters for that particular ONAP control component (block 1300). Referring to FIG. 6, if record offset number 4 was the last sequential record to which data was contributed, then record offset number x of the CCT 600-2, in block 1300, would be the next sequential record 5 in which app-C 115 contributes its mapping for the particular VNF. FIG. 14 depicts an example of ONAP configuration data 1410 being contributed to a record 1400 of the partitioned log of CCT 600-2. As shown, the ONAP configuration data 1410 includes a control component ID 1420 that uniquely identifies a component of ONAP 120 to which the configuration data 1410 is directed. The ONAP configuration data 1410 further includes a VNF ID 1430 that uniquely identifies the VNF 100 that is to be monitored, managed, and/or controlled by the identified ONAP component. The ONAP configuration data 1410 additionally includes a mapping 1440 between one or more topics and a respective VNF capability(ies) and parameter(s) that instructs the ONAP component which capability(ies) and parameter(s) of the VNF 100 that it is to monitor, manage, and/or control. The mapping 1440 informs the ONAP component the topic from which to consume the information published by the VNF 100 about particular VNF capabilities and parameters that enables the ONAP component to monitor, manage, and/or control the VNF 100.

Each ONAP control component parses the CCT 600-2 to identify a record(s) addressed to it, and locates and consumes the record at record offset number x (where record offset number x is the record to which the app-C 115 contributed its mapping in block 1300), including the control component ID, the VNF ID, and the mapping between topics and VNF capabilities and parameters (block 1305) (FIG. 13). Referring to the example of FIG. 14, an ONAP control component (e.g., gVNFM, MANO 315, or DCAE) parses CCT 600-2 to identify a record 1400 having ONAP configuration data 1410 that includes a control component ID 1420 that indicates it is addressed to the particular ONAP control component. The ONAP control component consumes the ONAP configuration data 1410 from the identified record 1400, retrieving the VNF ID 1430 and the mapping 1440 between one or more topics and a respective VNF capability(ies) and parameter(s). Referring to FIG. 15, app-C 115 is shown passing the instructions 1525, that include the ONAP configuration data which specify the VNF capability(ies) and parameter(s) that each ONAP control component is to manage, monitor, or control, via CCT 600-2 (not shown in FIG. 15) to ONAP components 315, 320, 325, and 330.

A&AI component 335 parses the VDT 600-0 to identify a record(s) addressed to the A&AI 335, and locates and consumes the record at record offset number x (where record offset number x is the record to which the VNF 100 contributed its capabilities and parameters) to obtain the full capabilities and parameters of the VNF 100. Referring again to the example of FIG. 10, the A&AI component 335 parses VDT 600-0 to locate record 1010 that includes a component ID indicating that the record is addressed to the A&AI component 335. Upon locating record 1010, A&AI component 335 consumes the VNF ID 1015, and the VNF configuration, control, and monitoring parameters 1020. Referring to FIG. 15, app-C 115 is shown registering 1530 the VNF 100, and its capabilities and parameters, with the A&AI component 335 via VDT 600-0 (not shown in FIG. 15).

Returning to FIG. 8, the ONAP 120 control components begin managing the new VNF 100 (block 825). Each of the ONAP 120 control components monitor, manage, and/or control respective VNFs 100 based on the ONAP configuration data 1410 (FIG. 14) read from the CCT 600-2, and based on the VNF capability data contributed by the VNF 100 to the applicable topic(s) for consumption by the ONAP 120 components. Referring to FIG. 15, for example, the SO component 325 of the ONAP control components begins using 1535 the VNF 100 as a service component.

The exemplary process of FIG. 8 may be repeated for each new VNF 100 that needs to be registered with ONAP 120 and activated for use. The exemplary process of FIG. 8 may be performed in parallel for each new VNF 100 to be activated within any of server clusters 210-1 through 210-q.

Figure 16:
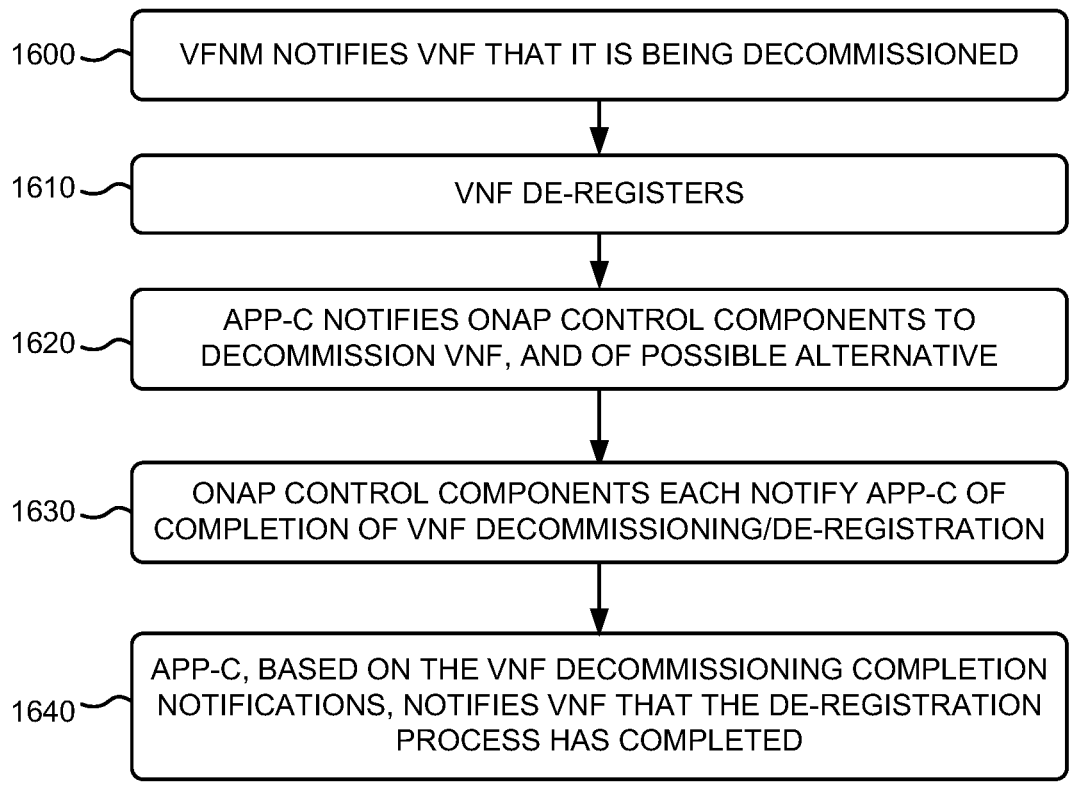
FIG. 16 is a flow diagram that illustrates an exemplary process for de-registering and decommissioning a VNF at the Open Networks Automation Platform.

FIG. 16 is a flow diagram that illustrates an exemplary process for de-registering and decommissioning a VNF 100 at ONAP 120. The exemplary process of FIG. 16 may be implemented by components of ONAP 120, in conjunction with a previously ONAP registered VNF 100, when the VNF 100 is to be decommissioned. The exemplary process of FIG. 16 is described with reference to the example data bus diagrams of FIGS. 19, 20, and 22, and the messaging/operations diagram of FIG. 23.

Figure 23:
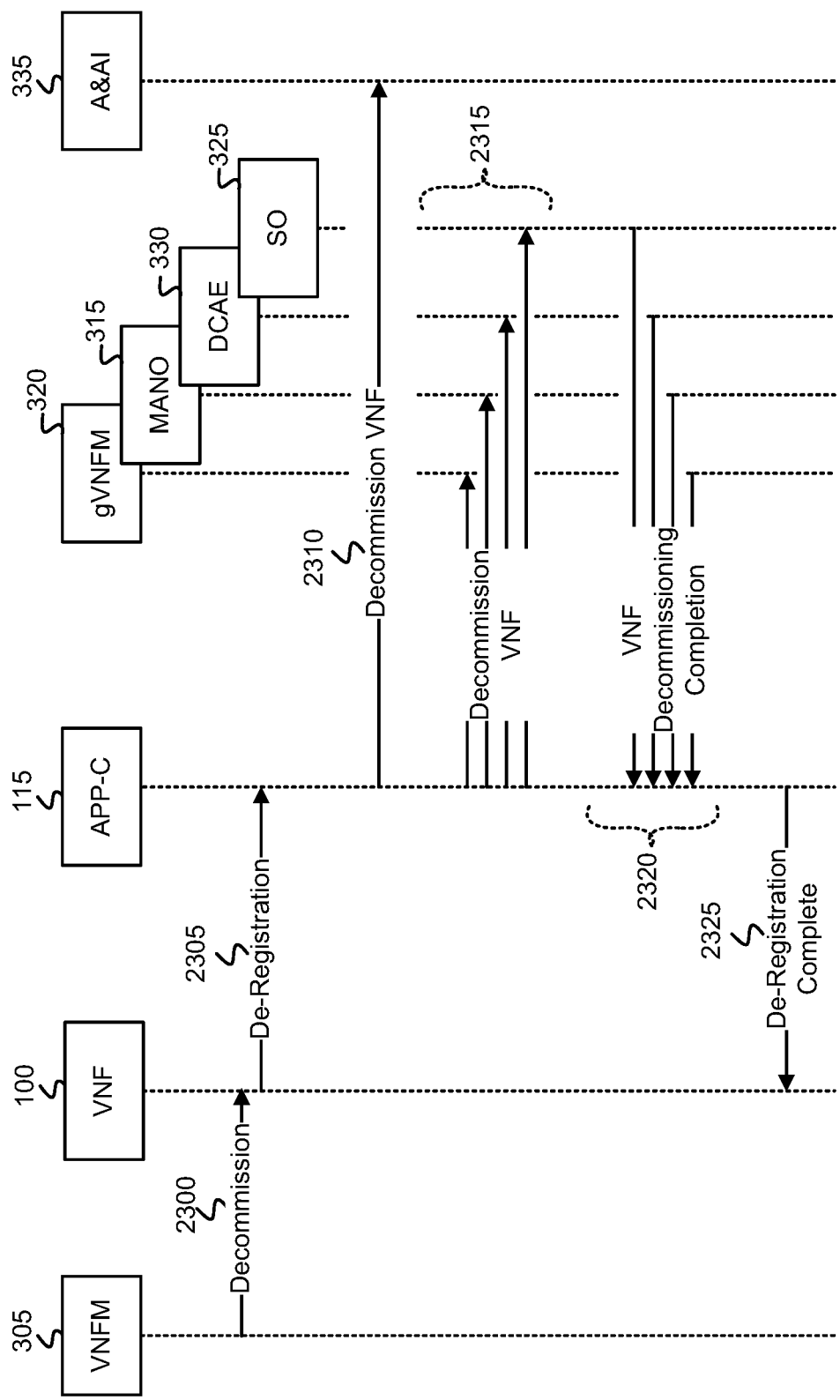
FIG. 23 depicts an exemplary messaging and operations diagram associated with the process of FIG. 16.

The exemplary process includes VFNM 305 notifying the previously registered VNF 100 that it is being decommissioned (block 1600). A particular VNF 100 may be decommissioned for various reasons including, for example, the VNF 100 becoming obsolete and a new VNF 100 replacing it, the VNF 100 being no longer used and decommissioned to free up resources, and/or the VNF 100 being combined with another VNF 100 to create a new VNF 100. FIG. 23 depicts VNFM 305 sending a message 2300 to VNF 100 notifying VNF 100 to begin a decommissioning process.

Figure 17:
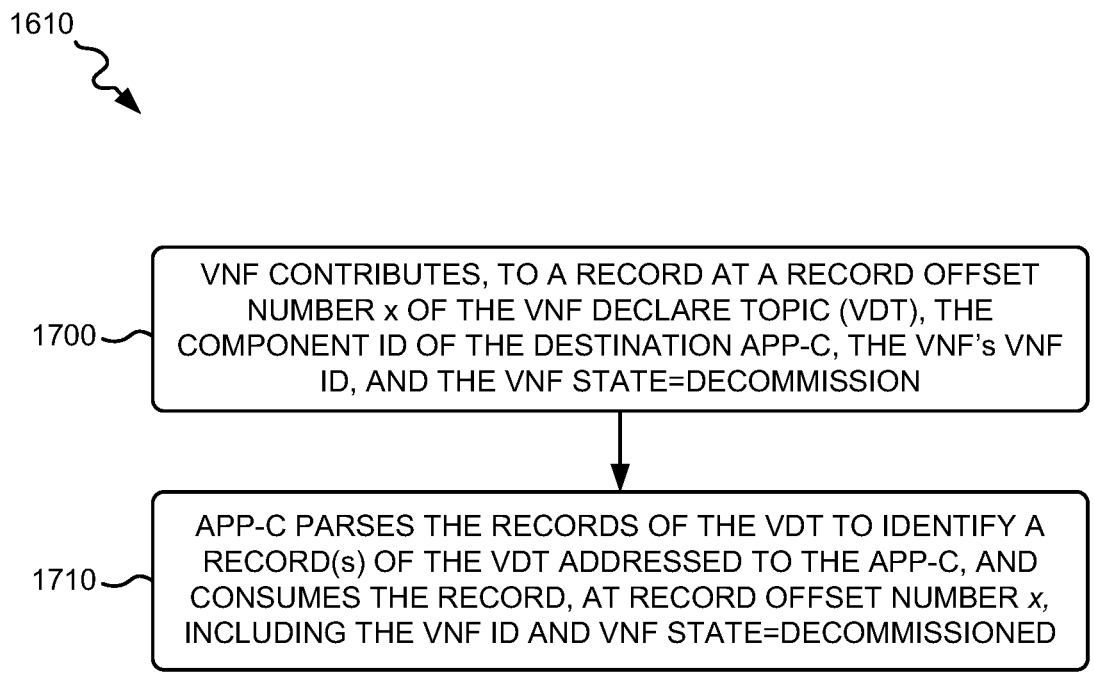
FIG. 17 depicts one exemplary implementation of the VNF de-registration of block 1610 of FIG. 16.
Figure 19:
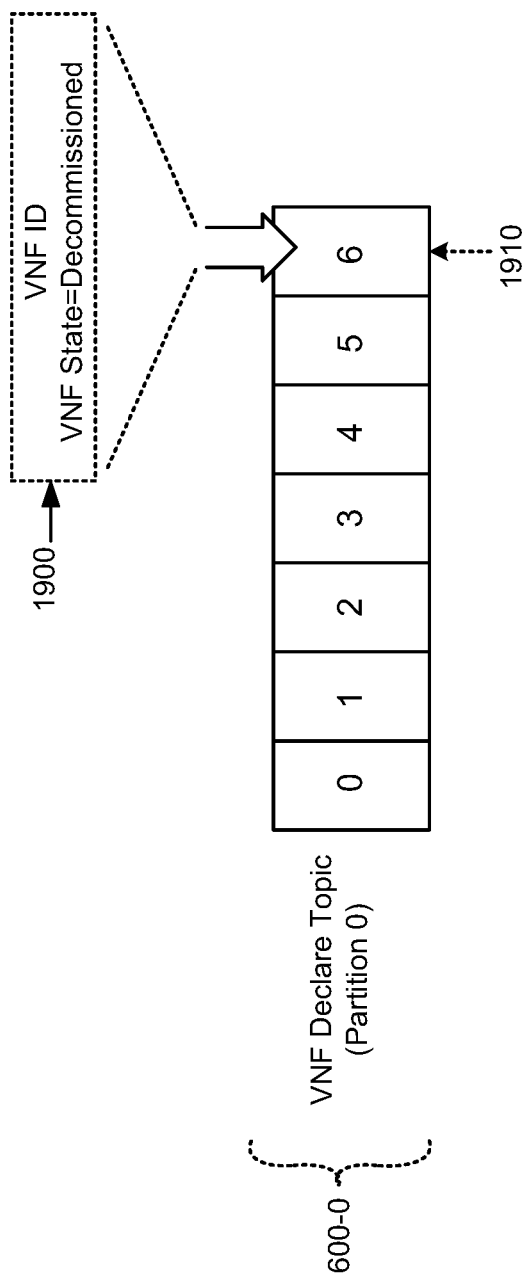
FIG. 19 depicts an example of a decommissioning notification being published by a VNF to a record of the partitioned log of the VNF Declare Topic of the data bus.

VNF 100, upon receipt of the notification, de-registers (block 1610). De-registration includes notifying the various components of ONAP 120, that may be involved in monitoring, managing, and/or controlling the VNF 100, that VNF 100 is being decommissioned and will no longer be available for use, and that the ONAP components will no longer need to execute processes to monitor, manage, and/or control the VNF 100. One exemplary implementation of the VNF de-registration of block 1610 of FIG. 16 is described with respect to FIG. 17. As illustrated in FIG. 17, the VNF 100 contributes, to a record at a record offset number x of the VNF Declare Topic (VDT) 600-0 (where "x," in the context of block 1700, refers to a next sequential record in the sequence of records of the partitioned log of VDT 600-0), the component ID of the destination app-C 115, the VNF 100's VNF ID, and the VNF state (VNF state=decommissioned) (block 1700). Referring to FIG. 6, if record offset number 4 was the last sequential record to which data was contributed, then record offset number x of the VDT 600-0, in block 1700, would be the next sequential record 5 in which VNF 100 contributes its VNF state=decommissioned. The VNF ID uniquely identifies the VNF 100, among other VNFs, to components of the ONAP 120. The VNF state information includes a VNF state indicator that indicates that the VNF 100 is being decommissioned. The VNF 100 may additionally contribute a specific date and/or time in the record of the VDT 600-0 indicating a date and/or time at which decommissioning and de-registration of the VNF 100 becomes effective. FIG. 19 depicts an example in which the VNF 100 (not shown) writes VNF decommissioning information 1900 to a record 1910, having a record offset number of 6, of the VDT 600-0 of data bus 110. The decommissioning information 1900 may additionally include a component ID that identifies app-C 115 as the destination consumer for the record 1910.

App-C 115 parses the records of the VDT 600-0 to identify a record(s) of the VDT 600-0 addressed to the app-C 115, and consumes the identified record, at record offset number x (where record offset number x is the record to which VNF 100 contributed its state in block 1700) including the VNF ID and VNF state (VNF state=decommissioned) (block 1710) (FIG. 17). Referring to the example of FIG. 19, the app-C 115 (not shown) locates record 1910 within VDT 600-0 of data bus 110, and reads and consumes the VNF ID, the VNF state, and the decommissioning date/time (if included in the record).

Figure 18:
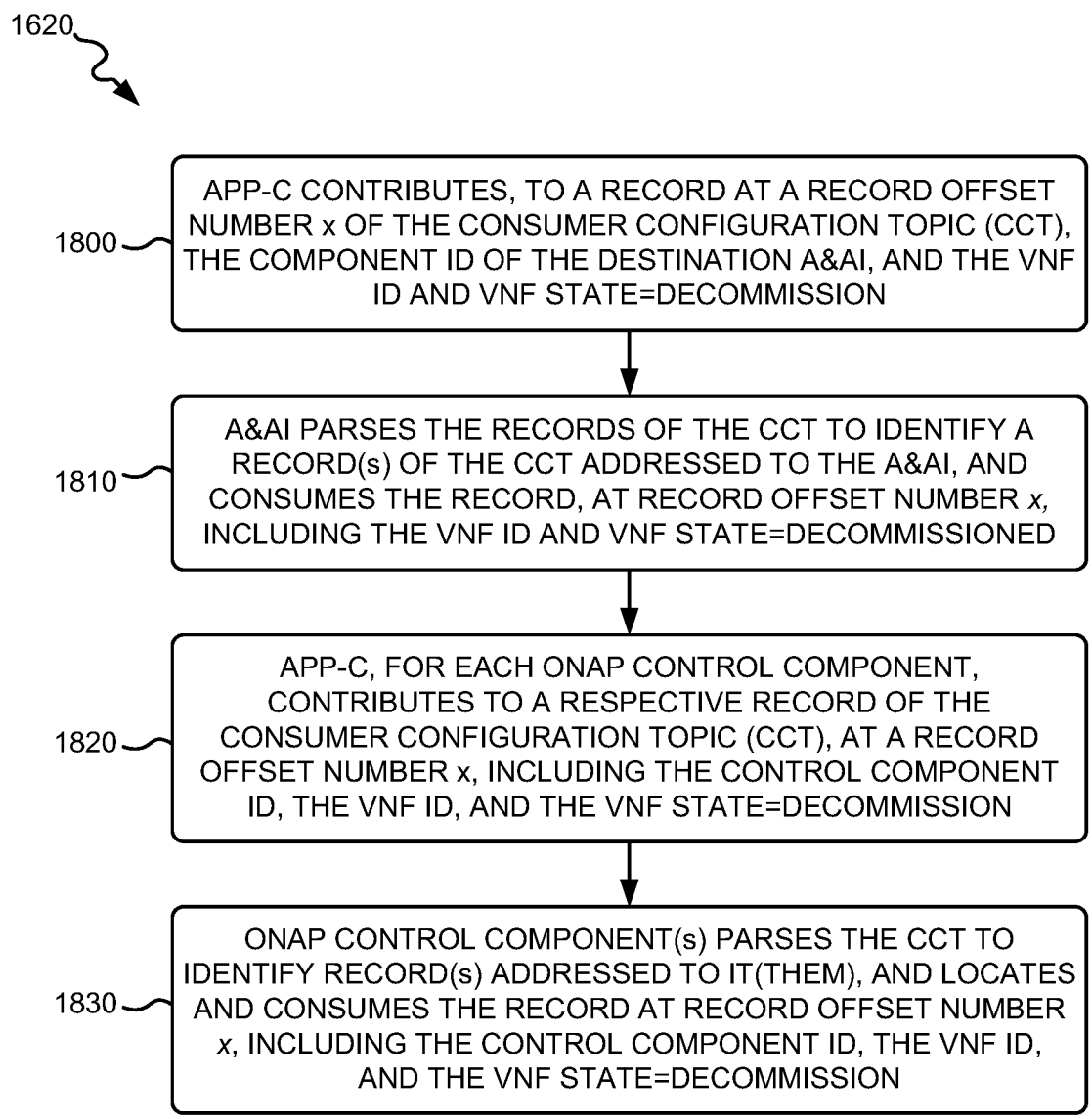
FIG. 18 depicts one exemplary implementation of the VNF decommissioning notification of block 1620 of FIG. 16.
Figure 20:
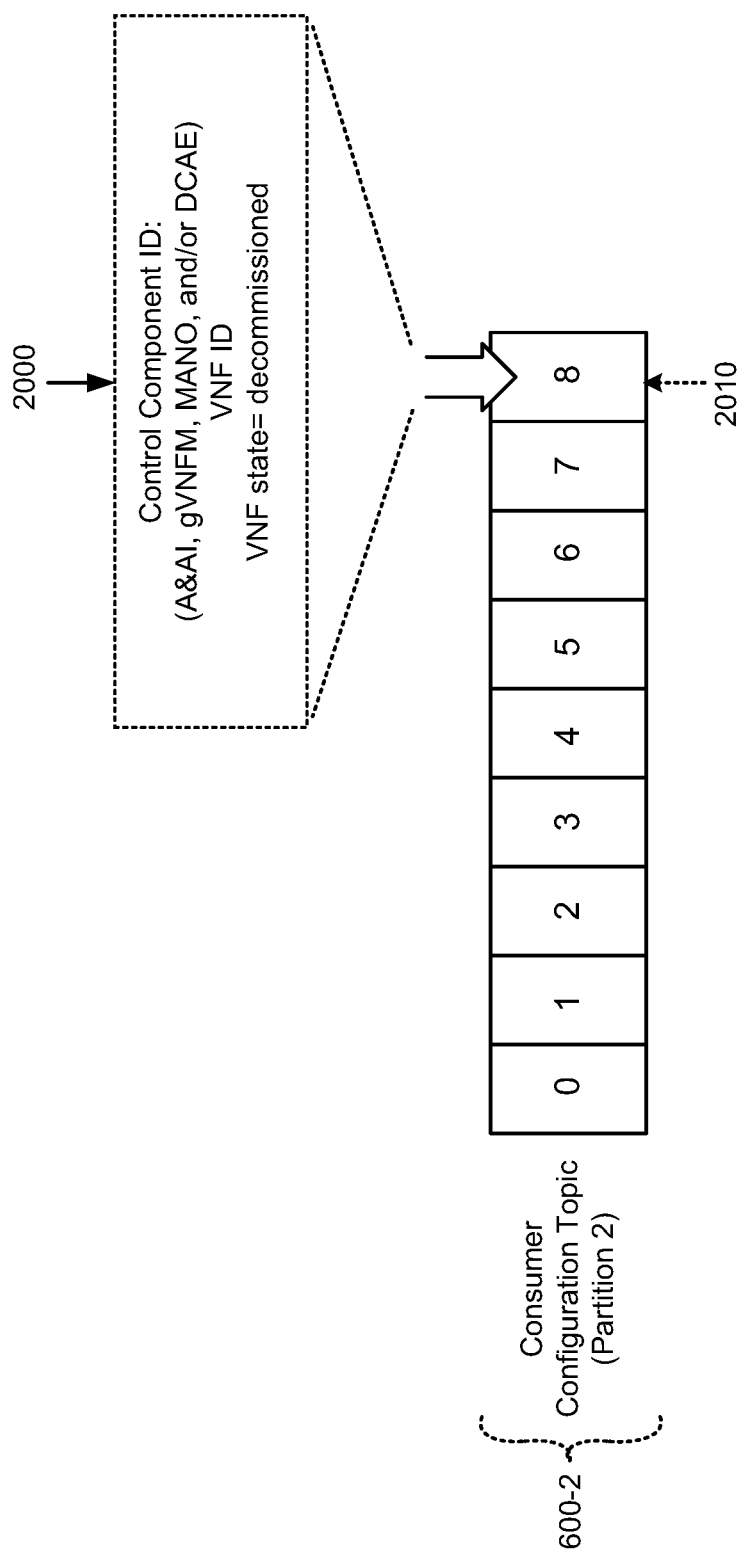
FIG. 20 depicts an example of a decommissioning notification being published by a controller function of the Open Network Automation Platform to a record of the partitioned log of the Consumer Configuration Topic of the data bus.

Returning to FIG. 16, app-C 115 of ONAP 120, based on reading the VNF decommissioning information from the VDT 600-0 of data bus 110, notifies ONAP control components to decommission the VNF 100, and of any possible alternative to the VNF 100 (block 1620). One exemplary implementation of the VNF decommissioning notification of block 1620 is described with respect to FIG. 18. As shown in FIG. 18, app-C 115 of ONAP 120 contributes, to a record at a record offset number x of the Consumer Configuration Topic (CCT) 600-2 (where "x," in the context of block 1800, refers to a next sequential record in the sequence of records of the partitioned log of CCT 600-2), the component ID of the destination A&AI component 335, and the VNF ID and VNF state (VNF state=decommission) (block 1800). FIG. 20 depicts an example in which the app-C 115 (not shown) writes VNF decommissioning information 2000 to a record 2010, having a record offset number of 8, of the CCT 600-2 of data bus 110. The decommissioning information 2000 may additionally include a control component ID that identifies A&AI 335 as the destination consumer for the record 2010.

A&AI component 335 parses the records of the CCT 600-2 to identify a record(s) of the CCT 600-2 addressed to the A&AI component 335, and consumes the record, at record offset number x (where record offset number x is the record to which app-C 115 contributed decommissioning information in block 1800), including the VNF ID and the VNF state (VNF state=decommissioned) (block 1810). Referring to the example of FIG. 20, the A&AI component 335 (not shown) locates record 2010 within CCT 600-2 of data bus 110, and reads and consumes the VNF ID, the VNF state, and the decommissioning date/time (if included in the record). Upon consumption and reading of the record from CCT 600-2, the A&AI component 335 removes the VNF 100, at any designated date/time, from its process(es) that provide the real-time views of system resources, services, and products. FIG. 23 depicts app-C 115 passing decommissioning information 2310 to A&AI component 335 via CCT 600-2 (not shown).

App-C 115, for each ONAP control component, contributes to a respective record of the Consumer Configuration Topic (CCT) 600-2 at a record offset number x (where "x," in the context of block 1820, refers to a next sequential record in the sequence of records of the partitioned log of CCT 600-2) including the control component ID (i.e., the unique component ID of, for example, the gVNFM 320, the MANO 315, the DCAE 330 or the SO 325), the VNF ID of the VNF 100, and a VNF state=decommissioned (block 1820). App-C 115 contributes VNF decommissioning data to a different record of the CCT 600-2 for each different ONAP component that is involved in monitoring, managing, and/or controlling the VNF 100. FIG. 20 depicts an example in which the app-C 115 (not shown) writes VNF decommissioning information 2000 to a record 2010, having a record offset number of 6, of the CCT 600-2 of data bus 110. The decommissioning information 2000 may include a control component ID that identifies gVNFM 320, the MANO 315, the DCAE 330, or the SO 325 as the destination consumer for the record 2010, a VNF ID that uniquely identifies the VNF 100 that is being monitored, managed, and/or controlled by the identified ONAP component, and a VNF state indicator that indicates that the VNF state of the identified VNF 100 is now set as "decommissioned."

The ONAP control component(s) parses the records of the CCT 600-2 to identify a record(s) of the CCT 600-2 addressed to the ONAP control component(s), and consumes the record, at record offset number x (where record offset number x is the record(s) to which app-C contributed decommissioning information in block 1820) including the VNF ID and the VNF state (VNF state=decommissioned) (block 1830). Referring to the example of FIG. 20, the ONAP control component(s) (e.g., gVNFM 320, the MANO 315, the DCAE 330, or the SO 325) (not shown) locates record 2010 within CCT 600-2 of data bus 110 that is addressed to the ONAP component, and reads and consumes the VNF ID, the VNF state, and the decommissioning date/time (if included in the record) from the VNF decommissioning information 2000. FIG. 23 depicts app-C 115 passing decommissioning information 2315 to each of the ONAP components involved in monitoring, managing, and/or controlling the VNF 100 (ONAP components gVNFM 320, MANO 315, DCAE 330, and SO 325 shown by way of example) via CCT 600-2 (not shown).

Figure 21:
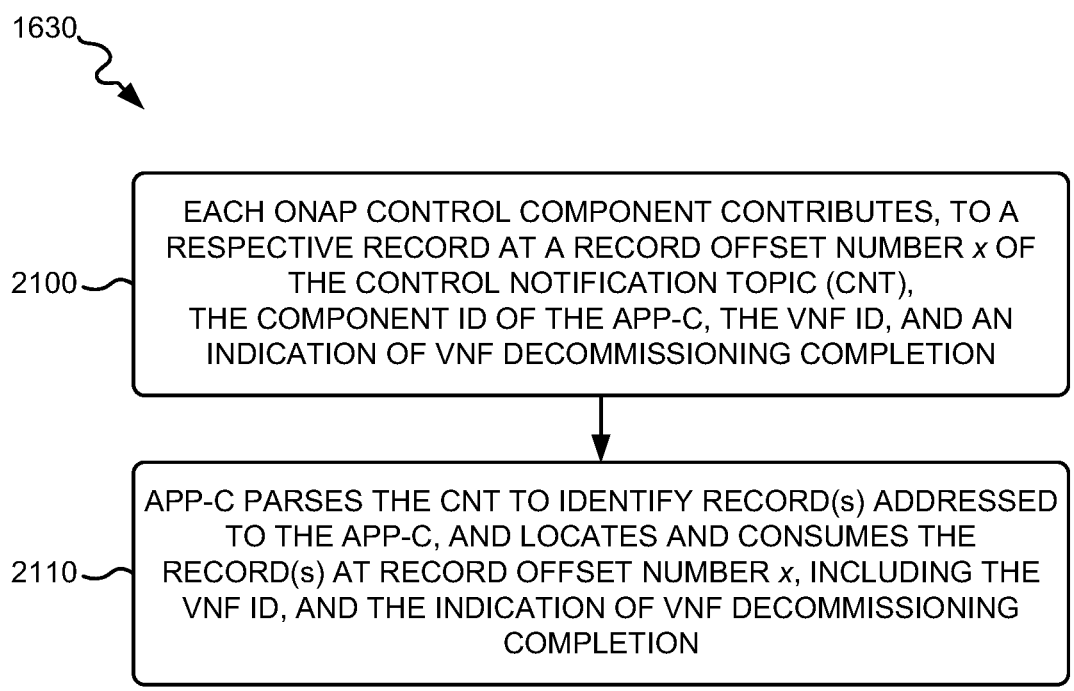
FIG. 21 depicts one exemplary implementation of the VNF decommissioning completion notification of block 1630 of FIG. 16.
Figure 22:
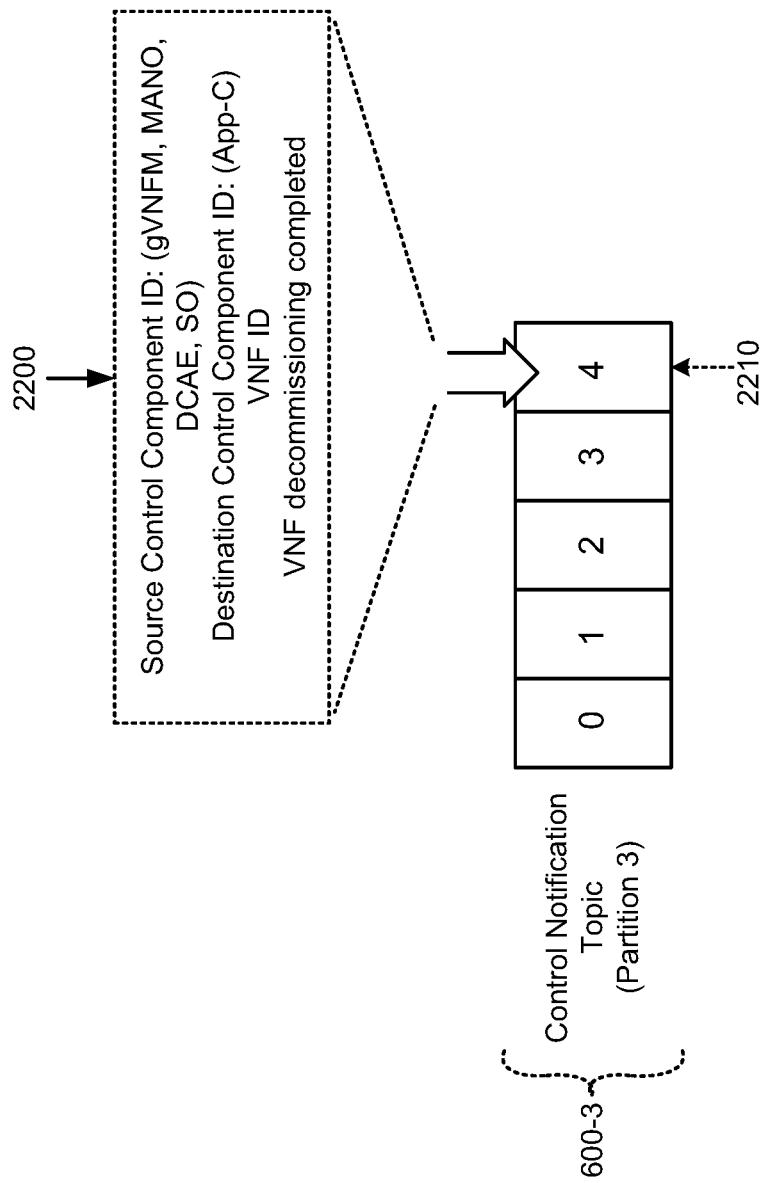
FIG. 22 depicts an example of a decommissioning completion notification published by an Open Network Automation Platform component to a record of the partitioned log of the Control Notification Topic of the data bus.

Returning to FIG. 16, the ONAP control components each notify app-C 115 of completion of VNF decommissioning/de-registration (block 1630). One exemplary implementation of block 1630 of FIG. 16 is described with respect to FIG. 21. As illustrated in FIG. 21, each ONAP control component involved in the monitoring, controlling, or managing of the VNF 100 contributes to a respective record of the Consumer Notification Topic (CNT) 600-3, at a record offset number x (where "x," in the context of block 2100, refers to a next sequential record in the sequence of records of the partitioned log of CNT 600-3), including the control component ID of the app-C 115, the VNF ID, and an indication of VNF decommissioning completion (block 2100). Each ONAP control component involved in monitoring, managing, and/or controlling the VNF 100 contributes VNF decommissioning completion data to a different record of the CNT 600-3. FIG. 22 depicts an example in which the ONAP control component (not shown) writes data 2200 acknowledging the completion of decommissioning of a VNF 100 to a record 2210, having a record offset number of 4, of the CNT 600-3 of data bus 110. The decommissioning completion data 2200 may include a source control component ID that identifies the ONAP control component contributing the completion data to CNT 600-3 (e.g., gVNFM 320, MANO 315, DCAE 330, or SO 325), a destination control component ID that identifies the app-C 115 as the destination consumer for the record 2210, a VNF ID that uniquely identifies the VNF 100 that has been decommissioned/de-registered, and an indication (e.g., a particular code or identifier) that the VNF decommissioning has been completed by the ONAP control component. Each VNF 100 may be managed, monitored, and controlled by the full set of ONAP components (SO 325, DCAE 330, A&AI 335, MANO, 315, gVNFM 320), or by only a subset of the ONAP components.

App-C 115 parses the records of the CNT 600-3 to identify a record(s) of the CNT 600-3 addressed to the app-C 115, and consumes the record, at record offset number x (where record offset number x is the record(s) to which each ONAP control component contributed its indication of VNF decommissioning completion in block 2100) including the VNF ID and the VNF state (VNF state=decommissioned) (block 2110). Referring to the example of FIG. 22, the app-C 115 (not shown) locates record 2210 within CNT 600-3 of data bus 110 that is addressed to the app-C 115, and reads and consumes the source control component ID, the VNF ID, and the indication that the decommissioning of the VNF 100 has been completed. FIG. 23 depicts the ONAP control components (e.g., gVNFM 320, MANO 315, DCAE 330, and SO 325 shown by way of example) passing a VNF decommissioning completion notification 2320 to app-C 115 via CNT 600-3 (not shown).

Returning to FIG. 16, app-C 115, based on the VNF decommissioning completion notifications received from the ONAP control components, notifies the VNF 100 that the de-registration process has completed (block 1640). FIG. 23 depicts app-C 115 passing a de-registration completion notification 2325 to the now decommissioned and de-registered VNF 100 to complete the de-registration process.

The exemplary process of FIG. 16 may, for example, be repeated each time a previously registered and commissioned VNF 100 needs to be decommissioned.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 8, 9, 11A, 11B, 13, 16, 17, 18, and 21, and message/operation flows with respect to FIGS. 15 and 23, the order of the blocks and/or operations/signaling/message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   reading, from a data bus by a network functions virtualization (NFV) system, registration data published to the data bus by a Virtual Network Function (VNF);
   publishing data specifying particular information the VNF is to publish and to which topics associated with the data bus the VNF is to publish the particular information;
   publishing, by the NFV system to the data bus based on the registration data, instructions to a plurality of NFV components of the NFV system defining VNF capabilities of the VNF that are to be at least one of managed, controlled, or monitored by the plurality of NFV components; and
   at least one of controlling, managing, or monitoring of the VNF, by the NFV system, based on the published instructions.

2. The method of claim 1, wherein the plurality of NFV components include at least one of a Management and Orchestration (MANO) component, a generic Virtual Network Function Manager (gVNFM), or a Data Collection, Analytics, and Events (DCAE) component.

3. The method of claim 1, wherein the NFV system comprises an Open Network Automation Platform (ONAP).

4. The method of claim 1, wherein the registration data includes at least one of VNF configuration parameters, VNF control parameters, or VNF monitoring parameters associated with the VNF.

5. The method of claim 1, wherein reading the registration data includes reading VNF parameters from a first topic associated with the data bus to which the VNF parameters are published by the VNF.

6. The method of claim 5, further comprising publishing configuration data to a record of a second topic of the data bus, wherein the configuration data includes a mapping between one or more of the topics to the VNF capabilities and the VNF parameters that are to be managed, controlled, or monitored.

7. The method of claim 1, further comprising:

reading, by the plurality of NFV components, the instructions to determine which of the VNF capabilities of the VNF are to be managed, controlled, or monitored by which of the plurality of NFV components.

8. A network functions virtualization (NFV) system coupled to a data bus, comprising:

a plurality of NFV system components executed by at least one computer; and an application controller executed by at least one processor and configured to:

read, from the data bus, registration data published to the data bus by a Virtual Network Function (VNF);

publish data specifying particular information the VNF is to publish and to which topics associated with the data bus the VNF is to publish the particular information; and publish, to the data bus based on the registration data, instructions to the plurality of NFV system components defining VNF capabilities of the VNF that are to be at least one of managed, controlled, or monitored by the plurality of NFV system components.

9. The NFV system of claim 8, wherein the plurality of NFV system components include at least one of a Management and Orchestration (MANO) component, a generic Virtual Network Function Manager (gVNFM), or a Data Collection, Analytics, and Events (DCAE) component.

10. The NFV system of claim 8, wherein the NFV system comprises an Open Network Automation Platform (ONAP).

11. The NFV system of claim 8, wherein the registration data comprises at least one of VNF configuration parameters, VNF control parameters, or VNF monitoring parameters associated with the VNF.

12. The NFV system of claim 8, wherein, when reading the registration data, the application controller is further configured to read VNF parameters from a first topic associated with the data bus to which the VNF published the VNF parameters.

13. The NFV system of claim 12, wherein the application controller is further configured to publish configuration data to a record of a second topic of the data bus, wherein the configuration data includes a mapping between one or more of the topics to the VNF capabilities and the VNF parameters that are to be managed, controlled, or monitored.

14. The NFV system of claim 8, wherein the plurality of NFV system components are configured to:

read the instructions to determine which of the VNF capabilities of the VNF are to be managed, controlled, or monitored by which of the plurality of NFV system components.

15. A non-transitory storage medium storing instructions executable by one or more network devices implementing a network functions virtualization (NFV) system, wherein the instructions comprise instructions to cause the one or more network devices to:

read, from a data bus coupled to the one or more network devices, registration data published to the data bus by a Virtual Network Function (VNF);

publish data specifying particular information the VNF is to publish and to which topics associated with the data bus the VNF is to publish the particular information;

publish, to the data bus based on the registration data, instructions defining VNF capabilities of the VNF that are to be at least one of managed, controlled, or monitored of the one or more network devices; and at least one of control, manage, or monitor the VNF based on the published instructions.

16. The non-transitory storage medium of claim 15, wherein the one or more network devices include a Management and Orchestration (MANO) component, a generic Virtual Network Function Manager (gVNFM), and a Data Collection, Analytics, and Events (DCAE) component.

17. The non-transitory storage medium of claim 15, wherein the NFV system comprises an Open Network Automation Platform (ONAP).

18. The non-transitory storage medium of claim 15, wherein the registration data comprises at least one of VNF configuration parameters, VNF control parameters, or VNF monitoring parameters associated with the VNF.

19. The non-transitory storage medium of claim 15, wherein the instructions to cause the one or more network devices to read the registration data comprise instructions to cause the one or more network devices to read VNF parameters from a first topic associated with the data bus to which the VNF published the VNF parameters when declaring to the NFV system.

20. The non-transitory storage medium of claim 19, wherein the instructions further comprise instructions to cause the one or more network devices to publish configuration data to a record of a second topic of the data bus, wherein the configuration data includes a mapping between one or more of the topics to the VNF capabilities and the VNF parameters that are to be managed, controlled, or monitored.

* * * * *